US012728850B2

(12) United States Patent
Oniwa

(10) Patent No.: US 12,728,850 B2
(45) Date of Patent: Sep. 8, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yoshihiro Oniwa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 18/897,004

(22) Filed: Sep. 26, 2024

(65) Prior Publication Data

US 2025/0108800 A1 Apr. 3, 2025

(30) Foreign Application Priority Data

Sep. 29, 2023 (JP) ................................ 2023-169514

(51) Int. Cl.
*B60W 30/14* (2006.01)
*B60W 10/04* (2006.01)
(Continued)

(52) U.S. Cl.
CPC ............ *B60W 30/14* (2013.01); *B60W 10/04* (2013.01); *B60W 10/18* (2013.01); *B60W 10/20* (2013.01); *B60W 30/09* (2013.01); *B60W 30/0953* (2013.01); *B60W 30/0956* (2013.01); *B60W 2540/30* (2013.01)

(58) Field of Classification Search
CPC ...... B60W 30/14; B60W 30/16; B60W 10/20; B60W 30/08; B60W 30/143
See application file for complete search history.

(56) References Cited

U.S. PATENT DOCUMENTS

2015/0149037 A1* 5/2015 Lim ...................... B60W 10/20 701/41
2016/0185388 A1* 6/2016 Sim ...................... G06V 20/58 701/41

(Continued)

FOREIGN PATENT DOCUMENTS

JP 2016-091454 5/2016
JP 2016-200929 12/2016

(Continued)

OTHER PUBLICATIONS

Japanese Office Action for Japanese Patent Application No. 2023-169514 mailed Sep. 30, 2025.

(Continued)

*Primary Examiner* — Long T Tran
(74) *Attorney, Agent, or Firm* — Amin, Turocy & Watson, LLP

(57) ABSTRACT

A vehicle control device of an embodiment includes a recognizer configured to recognize a surrounding situation of a host vehicle, and a controller configured to control one or both of steering or acceleration/deceleration of the host vehicle when determination is made that an obstacle is present in front of the host vehicle, based on a recognition result of the recognizer, in which the controller executes at least steering control of moving the host vehicle to a center of a traveling lane when the recognizer determines that the obstacle is present in front of the host vehicle.

5 Claims, 20 Drawing Sheets

(51) Int. Cl.

*B60W 10/18* (2012.01)
*B60W 10/20* (2006.01)
*B60W 30/09* (2012.01)
*B60W 30/095* (2012.01)

(56) References Cited

U.S. PATENT DOCUMENTS

| | | | | |
|---|---|---|---|---|
| 2018/0345960 | A1* | 12/2018 | Fujii | B60W 30/0953 |
| 2021/0009103 | A1 | 1/2021 | Yashiro et al. | |
| 2021/0107510 | A1* | 4/2021 | Kato | B60W 30/18163 |
| 2022/0234607 | A1* | 7/2022 | Hata | B60W 40/08 |
| 2022/0314976 | A1* | 10/2022 | Yasui | B60W 30/18163 |
| 2022/0314977 | A1* | 10/2022 | Yasui | B60W 30/09 |
| 2022/0314978 | A1* | 10/2022 | Yasui | B60W 50/16 |
| 2023/0008744 | A1* | 1/2023 | Kozono | G06V 20/58 |
| 2023/0311864 | A1* | 10/2023 | Iwase | B60W 30/09 701/301 |
| 2023/0322231 | A1* | 10/2023 | Nishiguchi | B60W 30/18163 701/23 |
| 2024/0208496 | A1* | 6/2024 | Olsson | B60W 30/12 |

FOREIGN PATENT DOCUMENTS

| | | |
|---|---|---|
| JP | 2019-151185 | 9/2019 |
| JP | 2020-135677 | 8/2020 |
| JP | 2021-015428 | 2/2021 |
| JP | 2022-149751 | 10/2022 |
| JP | 2022-157397 | 10/2022 |
| JP | 2023-030595 | 3/2023 |
| JP | 2023-150866 | 10/2023 |

OTHER PUBLICATIONS

Japanese Office Action for Japanese Patent Application No. 2023-169514 mailed Apr. 25, 2025.

Japanese Notice of Allowance for Japanese Patent Application No. 2023-169514 mailed Feb. 24, 2026.

* cited by examiner

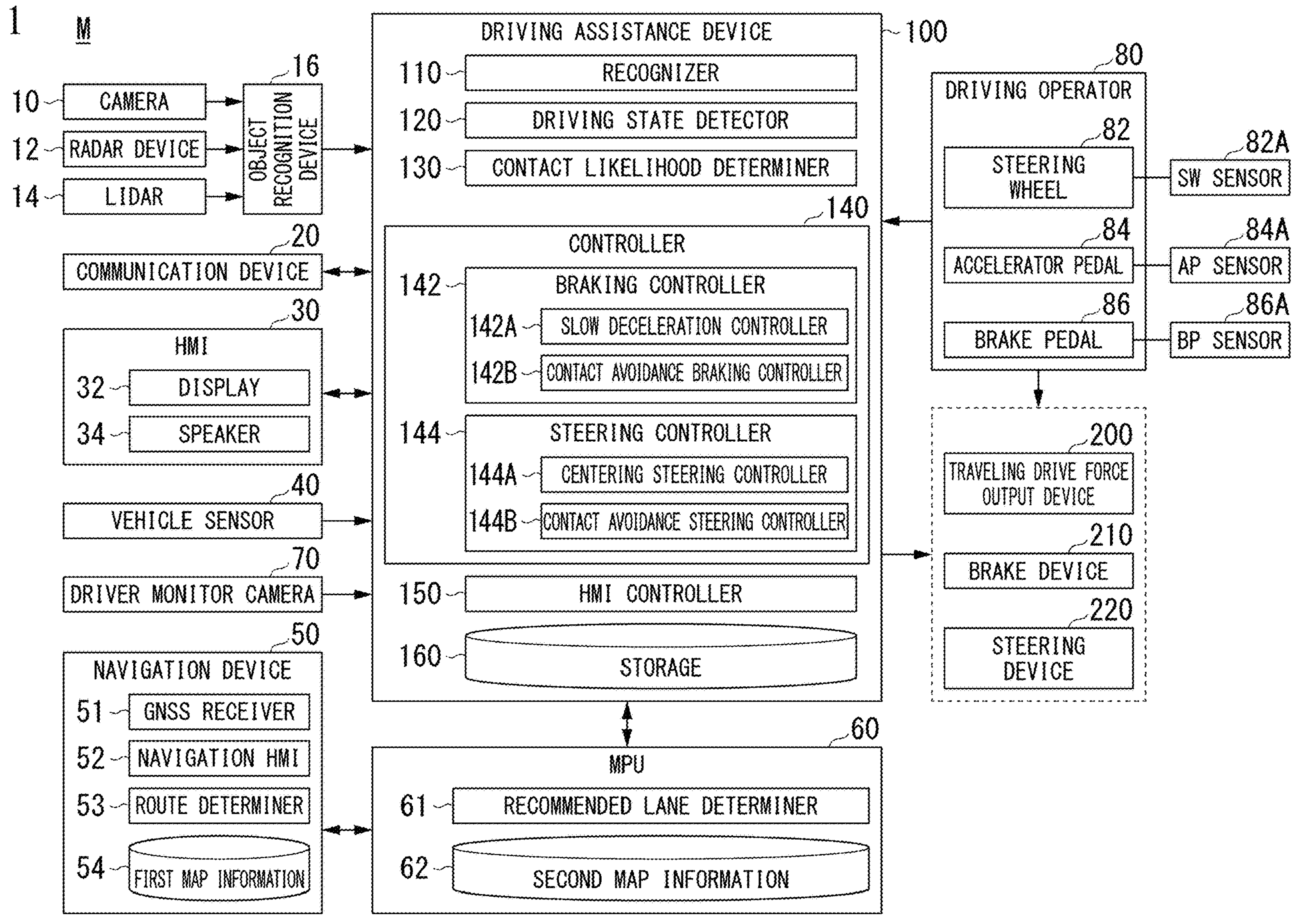
FIG. 1
M
10 CAMERA
12 RADAR DEVICE
14 LIDAR
16 OBJECT RECOGNITION DEVICE
20 COMMUNICATION DEVICE
30 HMI
32 DISPLAY
34 SPEAKER
40 VEHICLE SENSOR
70 DRIVER MONITOR CAMERA
50 NAVIGATION DEVICE
51 GNSS RECEIVER
52 NAVIGATION HMI
53 ROUTE DETERMINER
54 FIRST MAP INFORMATION
100 DRIVING ASSISTANCE DEVICE
110 RECOGNIZER
120 DRIVING STATE DETECTOR
130 CONTACT LIKELIHOOD DETERMINER
140 CONTROLLER
142 BRAKING CONTROLLER
142A SLOW DECELERATION CONTROLLER
142B CONTACT AVOIDANCE BRAKING CONTROLLER
144 STEERING CONTROLLER
144A CENTERING STEERING CONTROLLER
144B CONTACT AVOIDANCE STEERING CONTROLLER
150 HMI CONTROLLER
160 STORAGE
60 MPU
61 RECOMMENDED LANE DETERMINER
62 SECOND MAP INFORMATION
80 DRIVING OPERATOR
82 STEERING WHEEL
84 ACCELERATOR PEDAL
86 BRAKE PEDAL
82A SW SENSOR
84A AP SENSOR
86A BP SENSOR
200 TRAVELING DRIVE FORCE OUTPUT DEVICE
210 BRAKE DEVICE
220 STEERING DEVICE

FIG. 10

| ACTIVATION PHASE | CONTROL | ACTIVATION START SPEED |
|---|---|---|
| AUTOMATIC STEERING AVOIDANCE, CONTACT AVOIDANCE STEERING | CONTACT AVOIDANCE STEERING CONTROL | 40 [km/h] OR HIGHER |
| ALERT, CONTACT CAUTION ALARM | CENTERING STEERING CONTROL | 30 [km/h] OR HIGHER |
| | SLOW DECELERATION CONTROL (AP OPERATION) | 30 [km/h] OR HIGHER |
| | SLOW DECELERATION CONTROL (NO AP OPERATION) | 5 [km/h] OR HIGHER |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-169514, filed Sep. 29, 2023, the content of which is incorporated herein by reference.

BACKGROUND

Field of the Invention

The present invention relates to a vehicle control device, a vehicle control method, and a storage medium.

Description of Related Art

In recent years, efforts have been actively made to provide access to a sustainable transportation system with special attention to people in vulnerable situations among traffic participants. To implement this, research and development for further improving the safety or convenience of traffic through research and development regarding a preventive safety technique has been focused on. In this context, in recent years, a technique for performing, when determination is made that a target object and a host vehicle are likely to be close to each other, slow braking control of the host vehicle such that the target object is included in a camera detection range or a technique for estimating the presence or absence of collision between a following vehicle and an obstacle when a host vehicle is made to avoid collision with the obstacle by an avoidance operation of any one of lane change and steering, and determining an avoidance operation based on an estimation result of the presence or absence of collision has been disclosed (for example, Japanese Unexamined Patent Application, First Publication No. 2016-200929 and Japanese Unexamined Patent Application, First Publication No. 2019-151185).

SUMMARY

Incidentally, in the preventive safety technique, at a stage before contact avoidance control between a vehicle and a object is performed, a vehicle behavior for prompting an occupant of a vehicle to be alert regarding the surroundings has not been considered. For this reason, in the related art, there is a problem in that proper vehicle control is not able to be performed according to a surrounding situation of the vehicle for an occupant.

An object of the present application is to provide a vehicle control device, a vehicle control method, and a storage medium capable of performing more proper vehicle control according to a surrounding situation of a vehicle for an occupant to solve the above-described problem. The present application, in turn, contributes to the development of a sustainable transportation system.

A vehicle control device, a vehicle control method, and a storage medium according to the invention employ the following configurations.

(1) A vehicle control device according to an aspect of the invention includes a recognizer configured to recognize a surrounding situation of a host vehicle, and a controller configured to control one or both of steering or acceleration/deceleration of the host vehicle when determination is made that an obstacle is present in front of the host vehicle, based on a recognition result of the recognizer, in which the controller executes at least steering control of moving the host vehicle to a center of a traveling lane when the recognizer determines that the obstacle is present in front of the host vehicle.

(2) In the aspect of (1) described above, the controller executes the steering control of moving the host vehicle to the center of the traveling lane when the host vehicle is traveling within a prescribed range of the center of the traveling lane.

(3) In the aspect of (1) described above, the controller executes the steering control of moving the host vehicle toward the center of the traveling lane when the obstacle is present on a marking side for defining the traveling lane with respect to the host vehicle.

(4) In the aspect of (1) described above, the controller executes the steering control of moving the host vehicle toward the center of the traveling lane when the obstacle is present within a prescribed range with respect to the host vehicle in a width direction of the traveling lane.

(5) In the aspect of (1) described above, the controller does not execute the steering control of moving the host vehicle to the center of the traveling lane when the obstacle is present at the center of the traveling lane or in the traveling lane outside of the center as viewed from the host vehicle.

(6) In the aspect of (5) described above, the controller executes deceleration control of the host vehicle when not executing the steering control of moving the host vehicle to the center of the traveling lane.

(7) In the aspect of (1) described above, the vehicle control device further includes a driving state detector configured to detect a driving state of an occupant of the host vehicle, in which the controller controls one or both of the steering or the acceleration/deceleration of the host vehicle when distracted driving of the occupant is detected by the driving state detector.

(8) A vehicle control method according to another aspect of the present invention includes, by a computer, recognizing a surrounding situation of a host vehicle, controlling one or both of steering and acceleration/deceleration of the host vehicle when determination is made that an obstacle is present in front of the host vehicle, based on a recognized result, and executing at least steering control of moving the host vehicle to a center of a traveling lane when determination is made that the obstacle is present in front of the host vehicle.

(9) A computer-readable non-transitory storage medium according to still another aspect of the present invention stores a program for causing a computer to recognize a surrounding situation of a host vehicle, control one or both of steering or acceleration/deceleration of the host vehicle when determination is made that an obstacle is present in front of the host vehicle, based on a recognized result, and execute at least steering control of moving the host vehicle to a center of a traveling lane when determination is made that an obstacle is present in front of the host vehicle.

According to the aspects of (1) to (9) described above, it is possible to perform more proper vehicle control according to a surrounding situation of a vehicle for an occupant.

BRIEF DESCRIPTION OF THE DRAWINGS

FIG. 1 is a configuration diagram of a host vehicle in which a vehicle control device of a first embodiment is mounted.

FIG. 10 is a diagram illustrating a condition of a speed of a host vehicle for starting control for each activation phase.

DESCRIPTION OF EMBODIMENTS

Figure 2:
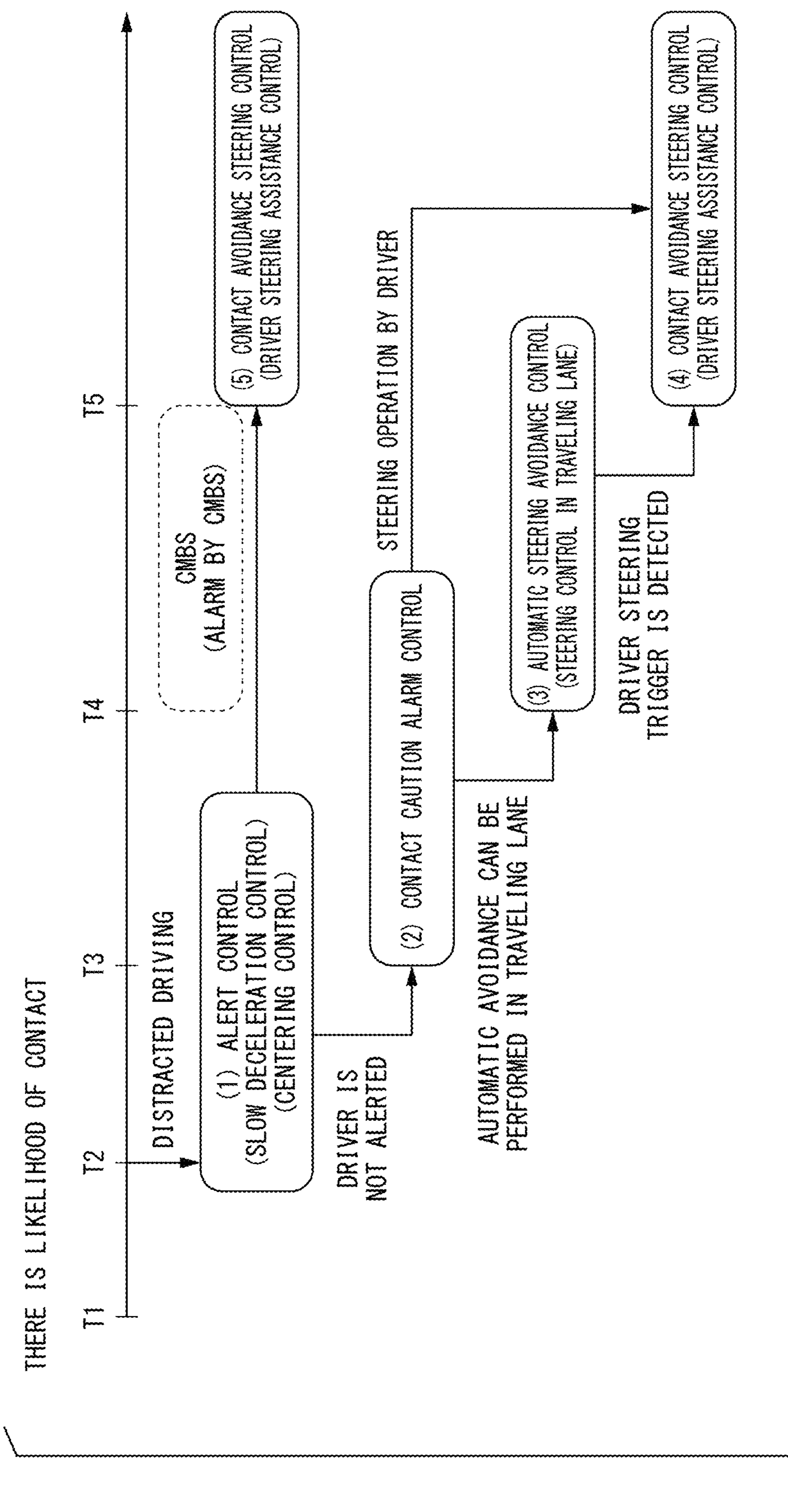
FIG. 2 is a diagram illustrating contents of vehicle control regarding contact avoidance.

Hereinafter, embodiments of a vehicle control device, a vehicle control method, and a storage medium will be described with reference to the drawings.

First Embodiment

Overall Configuration

FIG. 1 is a configuration diagram of a host vehicle M in which a vehicle control device of a first embodiment is mounted. The host vehicle M is, for example, a two-wheeled, three-wheeled, or four-wheeled vehicle, and a drive source thereof is an internal combustion engine such as a diesel engine or a gasoline engine, an electric motor, or a combination thereof. The electric motor operates using generated power by a generator coupled to the internal combustion engine or discharged power of a secondary battery or a fuel cell.

In the host vehicle M, for example, a camera 10, a radar device 12, light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, a driving assistance device 100, a traveling drive force output device 200, a brake device 210, and a steering device 220 are mounted. These devices or equipment are connected by a multiple communication line such as a controller area network (CAN) communication line, a serial communication line, a radio communication network, or the like. The configuration illustrated in FIG. 1 is merely an example, and some of the configuration may be omitted and a further configuration may be added. The driving assistance device 100 is an example of a "vehicle control device".

The camera 10 is, for example, a digital camera using a solid-state imaging element such as a charge coupled device (CCD) or a complementary metal oxide semiconductor (CMOS). The camera 10 is attached to any place on the host vehicle M. In a case where an image of the front is captured, the camera 10 is attached to an upper portion of a front windshield or a back surface of a rear-view mirror. The camera 10 periodically and repeatedly captures, for example, surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (distance and orientation) of the object. The radar device 12 is attached to any place on the host vehicle M. The radar device 12 may detect a position and a speed of an object by a frequency modulated continuous wave (FM-CW) system.

The LIDAR 14 irradiates the surroundings of the host vehicle M with light (or electromagnetic waves having a wavelength close to that of light) and measures scattered light. The LIDAR 14 detects a distance to a target based on a time from light emission to light reception. The irradiated light is, for example, pulsed laser light. The LIDAR 14 is attached to any place on the host vehicle M.

The object recognition device 16 executes sensor fusion processing on detection results of some or all of the camera 10, the radar device 12, and the LIDAR 14 to recognize a position, a type, a speed, and the like of an object. The object recognition device 16 outputs a recognition result to the driving assistance device 100. The object recognition device 16 may output the detection results of the camera 10, the radar device 12, and the LIDAR 14 to the driving assistance device 100 directly. The object recognition device 16 may be omitted from the host vehicle M. A part or all of the camera 10, the radar device 12, the LIDAR 14, and the object recognition device 16 are an example of an "external detection device".

The communication device 20 communicates with another vehicle present in the surroundings of the host vehicle M using, for example, a cellular network, a Wi-Fi network, Bluetooth (Registered Trademark), or dedicated short range communication (DSRC) or communicates with various server devices via a radio base station.

The HMI 30 presents various kinds of information to an occupant of the host vehicle M and receives an input operation by the occupant. The HMI 30 includes, for example, a display 32 and a speaker 34. The display 32 is, for example, a liquid crystal display (LCD) or an organic electro-luminescence (EL) display. The display 32 displays various kinds of images (including video) in the embodiment. The display 32 may be configured integrally with an input unit as a touch panel. The speaker 34 outputs prescribed sound (for example, alarm). The HMI 30 may be a microphone, buzzers, a vibration generation device (vibrator), a touch panel, switches, keys, and the like, in addition to the display 32 and the speaker 34.

The vehicle sensor 40 includes a vehicle speed sensor that detects a speed of the host vehicle M, an acceleration sensor that detects an acceleration, a yaw rate sensor that detects a yaw rate (for example, a rotational angular velocity around a vertical axis passing through the center of gravity of the host vehicle M), an orientation sensor that detects the orientation of the host vehicle M, a steering angle sensor that detects a steering angle (an angle of a steered wheel or an operating angle of a steering wheel) of the host vehicle M, and the like. The vehicle sensor 40 may be provided with a position sensor that detects the position of the host vehicle M. The position sensor is, for example, a sensor that acquires positional information (longitude/latitude information) from a global positioning system (GPS) device. The position sensor may be a sensor that acquires the positional information using a global navigation satellite system (GNSS) receiver 51 of the navigation device 50.

The navigation device 50 includes, for example, the GNSS receiver 51, a navigation HMI 52, and a route determiner 53. The navigation device 50 stores first map information 54 in a storage device such as a hard disk drive (HDD) or a flash memory. The GNSS receiver 51 specifies the position of the host vehicle M based on a signal received from GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partially or wholly shared with the above-described HMI 30. The route determiner 53 determines, for example, a route (hereinafter, referred to as an on-map route) from the position of the host vehicle M specified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The on-map route is output to the MPU 60. The navigation device 50 may perform route guidance using the navigation HMI 52 based on the on-map route. The navigation device 50 may be implemented by, for example, a function of a terminal device such as a smartphone or a tablet terminal possessed by the occupant. The navigation device 50 may transmit a current position and a destination to a navigation server via the communication device 20 and may acquire a route equivalent to the on-map route from the navigation server.

The MPU 60 includes, for example, a recommended lane determiner 61, and stores second map information 62 in a storage device such as an HDD or a flash memory. The recommended lane determiner 61 divides the on-map route provided from the navigation device 50 into a plurality of blocks (for example, divides the on-map route every 100 [m] in a vehicle moving direction), and determines a recommended lane for each block with reference to the second map information 62. The recommended lane determiner 61 determines which lane from the left the vehicle travels on. When there is a branching place on the on-map route, the recommended lane determiner 61 determines a recommended lane such that the host vehicle M can travel on a reasonable route for moving to a branch destination. The second map information 62 is map information having accuracy higher than the first map information 54. The second map information 62 includes, for example, information regarding a center of a lane or lane boundary information such as road markings for defining a lane. In the second map information 62, road information, traffic regulation information, address information (address and zip code), facility information, telephone number information, and the like may be included. The second map information 62 may be updated at any time by the communication device 20 communicating with other devices. The first map information 54 and the second map information 62 may be stored in a storage in the driving assistance device 100.

The driver monitor camera 70 is, for example, a digital camera using a solid-state imaging element such as a CCD or a CMOS. The driver monitor camera 70 is attached to any place in the host vehicle M at a position and in a direction where a head and an upper body (including positions of hands) of an occupant (hereinafter, referred to as a driver) seated in a driver's seat of the host vehicle M can be imaged from the front (in a direction of imaging a face). For example, the driver monitor camera 70 is attached to an upper portion of a display device provided in a center portion of an instrument panel of the host vehicle M. The driver monitor camera 70 outputs an image obtained by imaging the inside of a vehicle cabin including the driver of the host vehicle M from the disposed position, to the driving assistance device 100.

The driving operator 80 includes, for example, a steering wheel 82, an accelerator pedal 84, a brake pedal 86, a direction indicator operation switch, a shift lever, and other operators. A sensor that detects an operation amount or the presence or absence of an operation is attached to the driving operator 80, and a detection result is output to the driving assistance device 100 or some or all of the traveling drive force output device 200, the brake device 210, and the steering device 220.

For example, a steering wheel sensor (SW sensor) 82A is attached to the steering wheel 82. The SW sensor 82A detects whether or not the driver grips the steering wheel 82. The SW sensor 82A detects an operation amount (steering torque amount or steering amount) of the steering wheel 82 by the driver. The steering wheel 82 does not necessarily have an annular shape, and may be in a form of a deformed steering wheel, a joystick, a button, or the like. In this case, the SW sensor 82A detects an operation amount according to the form.

An accelerator pedal sensor (AP sensor) 84A is attached to the accelerator pedal 84. The AP sensor 84A detects an operation amount (operation degree) of the accelerator pedal 84 that changes according to an operation of the driver on the accelerator pedal 84. A brake pedal sensor (BP sensor) 86A is provided in the brake pedal 86. The BP sensor 86A detects an operation amount (operation degree) of the brake pedal 86 that changes according to an operation of the driver on the brake pedal 86.

The traveling drive force output device 200 outputs a traveling drive force (torque) for the host vehicle M to travel, to drive wheels. The traveling drive force output device 200 includes, for example, a combination of an internal combustion engine, an electric motor, a transmission, and the like, and an electronic control unit (ECU) that controls these devices. The ECU controls the above-described configuration according to information input from the driving assistance device 100 or information input from the driving operator 80.

The brake device 210 includes, for example, a brake caliper, a cylinder that transmits hydraulic pressure to the brake caliper, an electric motor that generates hydraulic pressures in the cylinder, and an ECU. The ECU controls the electric motor according to information input from the driving assistance device 100 or information input from the driving operator 80 such that brake torque according to a braking operation is output to each wheel. The brake device 210 may include a mechanism that transmits hydraulic pressure generated by an operation of the brake pedal included in the driving operator 80 to the cylinder via a master cylinder, as a backup. the brake device 210 is not limited to the configuration described above, and may be an electronically controlled hydraulic brake device that controls an actuator according to information input from the driving assistance device 100 to transmit the hydraulic pressure of the master cylinder to the cylinder.

The steering device 220 includes, for example, a steering ECU and an electric motor. The electric motor applies a force to a rack and pinion mechanism to change directions of steerable wheels. The steering ECU drives the electric motor according to information input from the driving assistance device 100 or information input from the driving operator 80 and changes the directions of the steerable wheels.

Driving Assistance Device

The driving assistance device 100 includes, for example, a recognizer 110, a driving state detector 120, a contact likelihood determiner 130, a controller 140, an HMI controller 150, and a storage 160. The recognizer 110, the driving state detector 120, the contact likelihood determiner 130, the controller 140, and the HMI controller 150 are implemented by, for example, a hardware processor such as a central processing unit (CPU) executing a program (software). Some or all of these components may be implemented by hardware (circuit unit; including circuitry) such as large scale integration (LSI), an application specific integrated circuit (ASIC), a field-programmable gate array (FPGA), or a graphics processing unit (GPU) or may be implemented by cooperation of hardware and software. The program may be stored in advance in a storage device (a storage device including a non-transitory storage medium) such as the HDD or the flash memory of the driving assistance device 100 or may be stored in a detachable storage medium such as a DVD or a CD-ROM and may be installed in the HDD or the flash memory of the driving assistance device 100 upon loading of the storage medium (non-transitory storage medium) in a drive device. The MMI controller 150 is an example of a "notification controller".

For example, settings in the traveling drive force output device 200, the brake device 210, and the steering device 220 are performed such that instructions from the driving assistance device 100 to the traveling drive force output device 200, the brake device 210, and the steering device 220 are executed with priority over the detection result from the driving operator 80. When a braking force based on an operation amount of the brake pedal 86 is greater than an instruction from the driving assistance device 100, braking may be set such that the braking force based on the operation amount of the brake pedal 86 is executed with priority. As a structure for executing the instruction from the driving assistance device 100 with priority, a communication priority in an onboard local area network (LAN) may be used.

The storage 160 may be implemented by various storage devices described above, a solid state drive (SSD), an electrically erasable programmable read only memory (EEPROM), a read only memory (ROM), or a random access memory (RAM), or the like. The storage 160 stores, for example, programs and various other kinds of information. In the storage 160, the map information (first map information 54 and second map information 62) described above may be stored.

The recognizer 110 recognizes a surrounding situation of the host vehicle M based on information input from the external detection device. For example, the recognizer 110 recognizes a position and a state such as a speed or an acceleration of an object present in the surroundings (for example, within a prescribed distance from the host vehicle M). The object is, for example, another vehicle, a bicycle, or a pedestrian. The position of the object is recognized as, for example, a position on absolute coordinates with a representative point (center of gravity, drive shaft center, or the like) of the host vehicle M as an origin, and is used for control. The position of the object may be represented by a representative point such as the center of gravity or a corner of the object or may be represented by a region. The "state" of the object may include the acceleration or jerk of the object or an "action state" (for example, the vehicle is changing a lane or is about to change a lane). The recognizer 110 recognizes a relative position or a relative speed to the object.

The recognizer 110 recognizes, for example, a lane (traveling lane) on which the host vehicle M is traveling. For example, the recognizer 110 recognizes a traveling lane by comparing a pattern (for example, an array of solid lines and broken lines) of a road marking obtained from the second map information 62 with a pattern of a road marking surrounding the host vehicle M recognized from an image captured by the camera 10. The recognizer 110 may recognize a traveling lane by recognizing a road marking or a lane boundary (road boundary) such as a road shoulder, a curb, a median strip, or a guardrail, instead of a road marking. In the recognition, the position of the host vehicle M acquired from the navigation device 50 or a processing result of the INS may be taken into account. The recognizer 110 recognizes an obstacle, a stop line, a red light, a tollgate, and other road events from the recognition result of the object. The obstacle is an object that the host vehicle M needs to avoid contact, and includes another vehicle or the like.

When a traveling lane is recognized, the recognizer 110 recognizes the position or posture of the host vehicle M with respect to the traveling lane. The recognizer 110 may recognize, for example, a deviation of a reference point of the host vehicle M from a lane center and an angle of the host vehicle M with respect to a line connecting the lane centers in a moving direction as a relative position and a posture of the host vehicle M with respect to the traveling lane. Instead, the recognizer 110 may recognize the position or the like of the reference point of the host vehicle M with respect to any side end portion (road marking or road boundary) of the traveling lane as a relative position of the host vehicle M with respect to the traveling lane.

The driving state detector 120 detects a prescribed driving state of an occupant (driver) of the host vehicle M. The prescribed driving state is, for example, a distracted driving state. The distracted driving refers to a state in which a driving operation of the host vehicle becomes slack (or is not performed) due to reduction in attention of the driver. For example, the driving state detector 120 detects the distracted driving state of the driver when a steering operation of the steering wheel 82 by the driver is less than a threshold (determination threshold TH1 described below) continues for a prescribed time or more, based on the detection result of the SW sensor 82A. The driving state detector 120 may detect the distracted driving state of the driver when a state in which an amount of change of the operation degree of each of the accelerator pedal 84 and the brake pedal 86 is less than a threshold continues for a prescribed time or more, based on the detection results of the AP sensor 84A and the BP sensor 86A. The prescribed time described above may be set, for example, to be variable depending on the speed of the host vehicle M or the degree of margin until the host vehicle M and an obstacle (for example, another vehicle) come into contact with each other. With this, it is possible to perform more proper distracted driving determination based on the speed of the host vehicle M and a positional relationship between the host vehicle M and an obstacle. The prescribed time may be a fixed time.

The driving state detector 120 may detect the distracted driving state when determination is made that the state of the driver detected based on an analysis result of an image captured by the driver monitor camera 70 is not a state suitable for driving. A case where the state of the driver is not a state suitable for driving is, for example, a case where the driver does not monitor the surroundings (in particular, the front) of the host vehicle M due to looking away or the like or a case where concentration is predicted to be reduced from a facial expression (sleepiness or pain).

The driving state detector 120 may detect contents of a driving operation of the driver. For example, the driving state detector 120 may detect a steering amount (amount of steering torque) of the driver based on the detection result of the SW sensor 82A, may detect an operation amount (operation degree) of the accelerator pedal 84 based on the detection result of the AP sensor 84A, or may detect an operation amount (operation degree) of the brake pedal 86 based on the detection result of the BP sensor 86A. The driving state detector 120 may detect a state in which the driver is not driving.

The contact likelihood determiner 130 recognizes whether or not there is a likelihood of contact between an obstacle (for example, another vehicle) and the host vehicle M based on the surrounding situation (external information) recognized by the recognizer 110. For example, the contact likelihood determiner 130 determines whether or not there is a likelihood of contact between the host vehicle M and another vehicle based on a contact margin value with another vehicle (preceding vehicle) present in front of the host vehicle M according to on the surrounding situation. The contact margin value is a value set based on, for example, a contact margin time TTC (Time To Collision), but may be a value set based on time headway THW. The time to collision TTC is derived, for example, by dividing a relative distance by a relative speed in a relationship between the host vehicle M and another vehicle. The time headway THW is derived, for example, by dividing a relative distance (inter-vehicle distance) by a speed of the host vehicle M. The time to collision TTC may be derived using, for example, a trained model or a prescribed function that outputs the time to collision TTC when the positions and speeds of the host vehicle M and another vehicle are input, or may be derived using a correspondence table in which a relative speed and a relative position correspond to the time to collision TTC. The above-described derivation method is similarly applied to the time headway THW. For example, the shorter the time to collision TTC (or the time headway THW), the smaller the contact margin value (in other words, the longer the time to collision, the greater the contact margin value). For example, the contact likelihood determiner 130 determines that there is a likelihood of contact between the host vehicle M and another vehicle when the contact margin value is less than a threshold, and determines that there is no likelihood of contact between the host vehicle M and another vehicle when the contact margin value is equal to or greater than the threshold.

The controller 140 controls one or both of steering and acceleration/deceleration of the host vehicle M based on at least one of a recognition result of the recognizer 110, a detection result of the driving state detector 120, and a determination result of the contact likelihood determiner 130. The controller 140 includes, for example, a braking controller 142 and a steering controller 144.

The braking controller 142 performs at least deceleration control of the host vehicle M based on a target deceleration of the host vehicle M when determination is made that an obstacle is present in front of the host vehicle M, based on the recognition result of the recognizer 110. The braking controller 142 performs braking control of the host vehicle M according to a driving operation (hereinafter, referred to as a driver operation) by the driver of the host vehicle M or regardless of an operation. For example, the braking controller 142 sets a deceleration state based on a contact margin value between the host vehicle M and an obstacle and executes deceleration control based on the set deceleration state. The braking controller 142 includes, for example, a slow deceleration controller 142A and a contact avoidance braking controller 142B.

The slow deceleration controller 142A performs slow deceleration control of the host vehicle M when determination is made by the recognizer 110 that an obstacle (for example, another vehicle) is present in front of the host vehicle M. The slow deceleration control is control (alert control) of prompting the driver to be alert regarding approach to another vehicle by a vehicle behavior of deceleration, and is a control different from contact avoidance control for avoiding contact with an obstacle (note that contact with an obstacle may be avoided consequently). For example, the slow deceleration controller 142A derives a target deceleration of the host vehicle M when determination is made that an obstacle is present in front of the host vehicle M, and performs deceleration of the host vehicle M to be close to the derived target deceleration without depending on an operation of the driver. The slow deceleration control may be executed when the driving state detector 120 detects that the driver performs distracted driving or may be executed when the contact margin value satisfies an activation condition of the slow deceleration control.

The slow deceleration controller 142A may stop the slow deceleration control when the driving state detector 120 detects an accelerator operation (an operation of the accelerator pedal 84) of a prescribed value (for example, a prescribed amount) or more of the driver during the slow deceleration control. In this way, it is possible to execute more proper override (switch to manual driving of the driver) control to the slow deceleration control by determining an intention of the driver by the accelerator operation. The prescribed value (prescribed amount) may be changed based on an operation speed of an accelerator operation of the driver. For example, the slow deceleration controller 142A sets the prescribed value to be smaller in a case where the operation speed is equal to or higher than a prescribed speed than in a case where the operation speed is lower than the prescribed speed, and sets the prescribed value to be greater in a case where the operation speed is lower than the prescribed speed than in a case where the operation speed is equal to or higher than the prescribed speed. The slow deceleration controller 142A may change, for example, the prescribed value according to the target deceleration, and may set the prescribed value to be greater as the target deceleration becomes greater. With this, it is possible to implement more proper override determination according to a driving situation of the driver or a surrounding situation of the host vehicle M.

The contact avoidance braking controller 142B performs emergency brake control for avoiding contact between the host vehicle M and an obstacle. For example, the contact avoidance braking controller 142B performs braking control (deceleration control) for avoiding contact when determination is made that there is a likelihood of contact between the host vehicle M and an obstacle, based on the surrounding situation recognized by the recognizer 110. The braking control that is executed by the contact avoidance braking controller 142B includes, for example, collision mitigation brake system (CMBS) control that supports contact avoidance or damage reduction. The braking control that is executed by the contact avoidance braking controller 142B may be executed, for example, after the slow deceleration control or may be executed when the contact margin value satisfies an activation condition of the above-described braking control.

The steering controller 144 controls the steering of the host vehicle M. The steering controller 144 includes, for example, a centering steering controller 144A and a contact avoidance steering controller 144B. The centering steering controller 144A executes steering control (centering steering control) of moving the host vehicle M toward the center of the traveling lane when determination is made by the recognizer 110 that an obstacle is present in front of the host vehicle M. The steering control is not for avoiding contact with an obstacle, and is control for making the driver aware of an obstacle in front to prompt the driver to be alert by a vehicle behavior of horizontally moving near the center (note that contact with the obstacle may be avoided consequently). With the steering control, it is possible to make the driver early aware of an obstacle in front, and to contribute to driving for avoiding contact. The centering steering control may be executed when the driving state detector 120 detects that the driver performs distracted driving or may be executed when the contact margin value satisfies an activation condition of the steering control. The slow deceleration control and the centering steering control described above may be executed separately or may be executed simultaneously at the same timing (for example, alert control stage).

The contact avoidance steering controller 144B performs steering control of the host vehicle M for avoiding contact between the host vehicle M and an obstacle. For example, when avoidance in the traveling lane of the host vehicle M can be performed, the contact avoidance steering controller 144B performs a steering operation to move in a direction of avoiding contact with an obstacle without departing from the same lane. After the host vehicle M performs an avoidance operation of contact with the obstacle while crossing a marking for defining the traveling lane by a steering operation of the driver, the contact avoidance steering controller 144B may perform steering control of the host vehicle M such that the behavior of the host vehicle M after the avoidance operation is stable. The steering control that is executed by the contact avoidance steering controller 144B may be executed, for example, after the centering steering control or may be executed when the contact margin value satisfies an activation condition of the above-described steering control.

The controller 140 may execute control other than the vehicle control described above. For example, the controller 140 may perform, as lane keeping assistance system (LKAS) control (lane keeping control), steering control to keep the host vehicle M in the traveling lane. In this case, the controller 140 controls, for example, the steering device 220 such that the host vehicle M does not depart from the traveling lane, to assist a steering operation of the driver.

The HMI controller 150 notifies the occupant (including the driver) of prescribed information by the HMI 30. The prescribed information includes, for example, information related to traveling of the host vehicle M such as information regarding the state of the host vehicle M or information regarding driving control. Information regarding the state of the host vehicle M includes, for example, a speed, an engine rotation speed, and a shift position of the host vehicle M. Information regarding the driving control includes, for example, the type of driving control being executed (for example, slow deceleration, centering steering control, contact avoidance braking control, or contact avoidance steering control), a reason for activation of the driving control, and a situation of the driving control. Information regarding the driving control may include information regarding alert or alarm to the driver. The prescribed information may include information regarding a current position or a destination of the host vehicle M and a residual amount of fuel, or the like or may include information not related to traveling control of the host vehicle M such as television programs and contents (for example, video) stored in a storage medium such as a DVD.

For example, the HMI controller 150 may generate an image including the prescribed information described above and may display the generated image on the display 32 of the HMI 30 or may generate sound indicating the prescribed information and output the generated sound from the speaker 34 of the HMI 30. A timing at which sound is output is, for example, a timing at which the driving control starts or stops, at an incoming call, a timing at which an image to be displayed is switched, and a timing at which the host vehicle M is brought into a prescribed state. The HMI controller 150 may output information received by the HMI 30 to the controller 140 and the like.

Controller

Next, details of vehicle control by the controller 140 will be described. FIG. 2 is a diagram illustrating the contents of vehicle control regarding contact avoidance. In an example of FIG. 2, the contents of vehicle control when determination is made that there is a contact likelihood based on the time to collision TTC are illustrated. In the example of FIG. 2, it is assumed that time T1 is earliest and times T2, T3, T4, and T5 are later than time T1 in that order.

First, at time T1 of FIG. 2, it is assumed that the contact likelihood determiner 130 determines that there is a likelihood of contact between the host vehicle M and the obstacle. When determination is made that there is a likelihood of contact, the controller 140 performs alert control ((1) in the drawing) for prompting the driver to be alert regarding the surroundings (in particular, the moving direction) based on the time to collision TTC and the detection result of the driving state detector 120.

Figure 3:
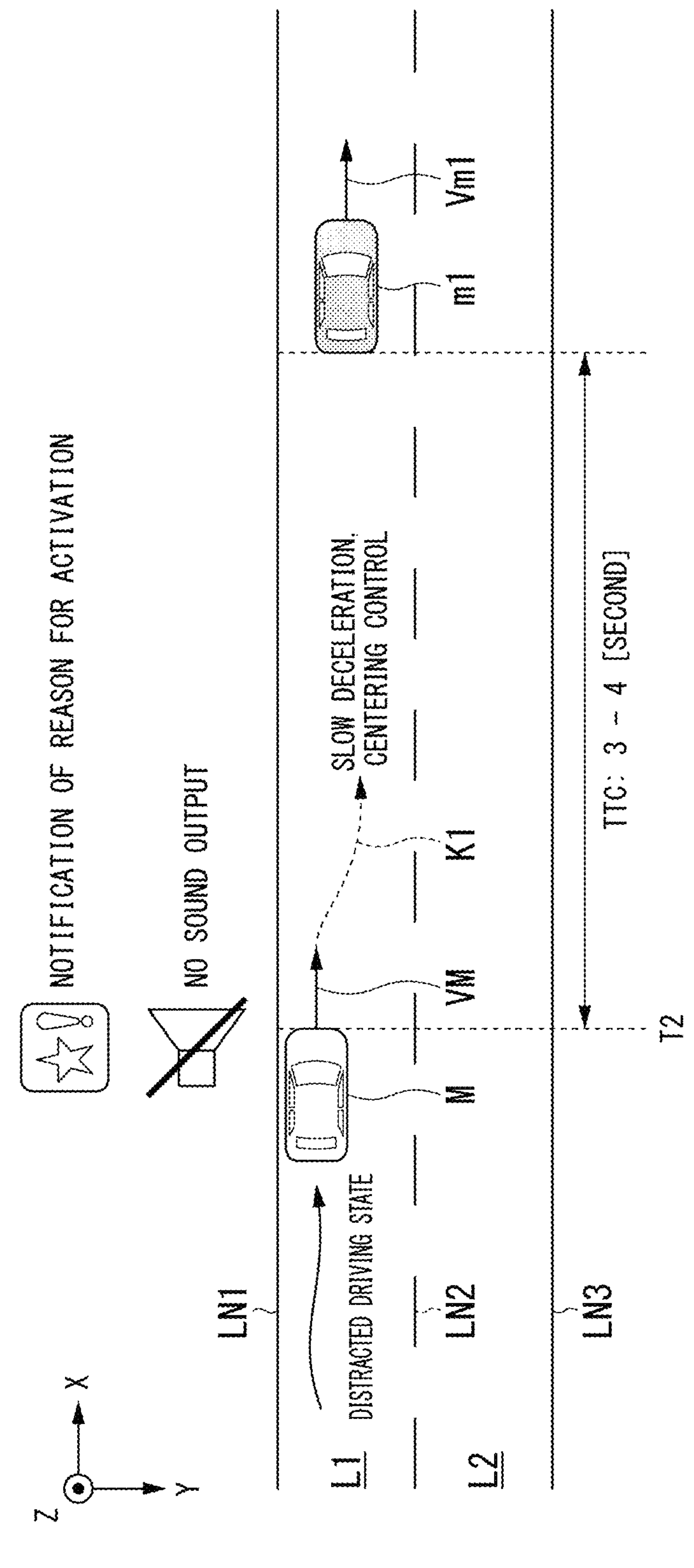
FIG. 3 is a diagram illustrating contents of alert control.

FIG. 3 is a diagram illustrating the contents of the alert control. In an example of FIG. 3, lanes L1 and L2 on which the vehicle can move in the same direction (an X-axis direction in the drawing) are illustrated. The lane L1 is defined by road markings LN1 and LN2, and the lane L2 is defined by road markings LN2 and LN3. In the example of FIG. 3, it is assumed that the host vehicle M is traveling on the lane L1 at a speed VM, and a vehicle (preceding vehicle) m1 that travels in front of the host vehicle M is traveling on the lane L1 at a speed Vm1 in front of the host vehicle M.

Hereinafter, description will be provided assuming that another vehicle m1 is an obstacle.

In the example of FIG. 3, the controller 140 performs the alert control when time T2 is reached at which the time to collision TTC (contact margin value) based on the relative position and the relative speed of the host vehicle M with respect to another vehicle m1 is equal to less than a first prescribed value (prescribed time), and detection is made that the driver performs distracted driving. Time T2 is, for example, a value set for the time to collision TTC of about 3 to 4 [second], but may be set to be variable based on a relative speed or a relative position, a road shape, or the like.

The alert control includes, for example, at least one of slow deceleration control by the slow deceleration controller 142A and centering steering control by the centering steering controller 144A. The slow deceleration control that is executed by the alert control is control in a first deceleration state. The slow deceleration controller 142A sets a target deceleration (first target deceleration) such that a load (vertical G) of a first upper limit deceleration (about 0.1 [G]) is applied to the driver in the moving direction (vertical direction). In the alert control (first deceleration state), the slow deceleration controller 142A may initially perform slow deceleration control at a first deceleration degree (for example, vertical G of 0.05 [G]), and thereafter, may perform deceleration control at a second deceleration degree (for example, vertical G of 0.1 [G]) greater than the first deceleration degree. In this way, by performing control such that the deceleration degree increases in stages, it is possible to reduce a load on the occupant such as the driver at the time of the start of execution of the slow deceleration control, and to restrain the occupant from being surprised by the slow deceleration control.

In the alert control, the centering steering controller 144A performs centering steering control of steering the host vehicle M toward the center of the traveling lane (lane L1). Details of the centering steering control will be described below (second embodiment). In the example of FIG. 3, the controller 140 generates a future target trajectory K1 of the host vehicle M corresponding to slow deceleration and centering steering control and controls steering and the speed of the host vehicle M to travel along the target trajectory K1.

At time T2, the HMI controller 150 may generate an image indicating an activation reason of the alert control (slow deceleration, centering steering control) for the driver and may display the generated image on the display 32 to give notification to the driver (note that no sound output is performed). With this, it is possible to transmit approach to an obstacle to the driver to prompt the driver to be alert, and to prompt an occupant to perform an early avoidance operation.

Here, in a case where activation determination is performed using the time to collision TTC, when the relative speed of the host vehicle M with respect to another vehicle m1 is 0 (zero), there is a possibility that the alert control cannot be performed at a proper timing. When another vehicle m1 is decelerated or the host vehicle M is accelerated, there is a possibility that an activation timing is delayed. Accordingly, in the first embodiment, in control in which slow deceleration or centering steering control is performed, the position of another vehicle m1 before or after a prescribed time is estimated, a contact margin value is derived with respected to the estimated position, and activation determination for alert control such as slow deceleration control or centering steering control is performed. Hereinafter, several examples of activation determination for the alert control will be described. In the following description, it is assumed that the contact margin value is set based on the time headway THW.

First Activation Determination

Figure 4:
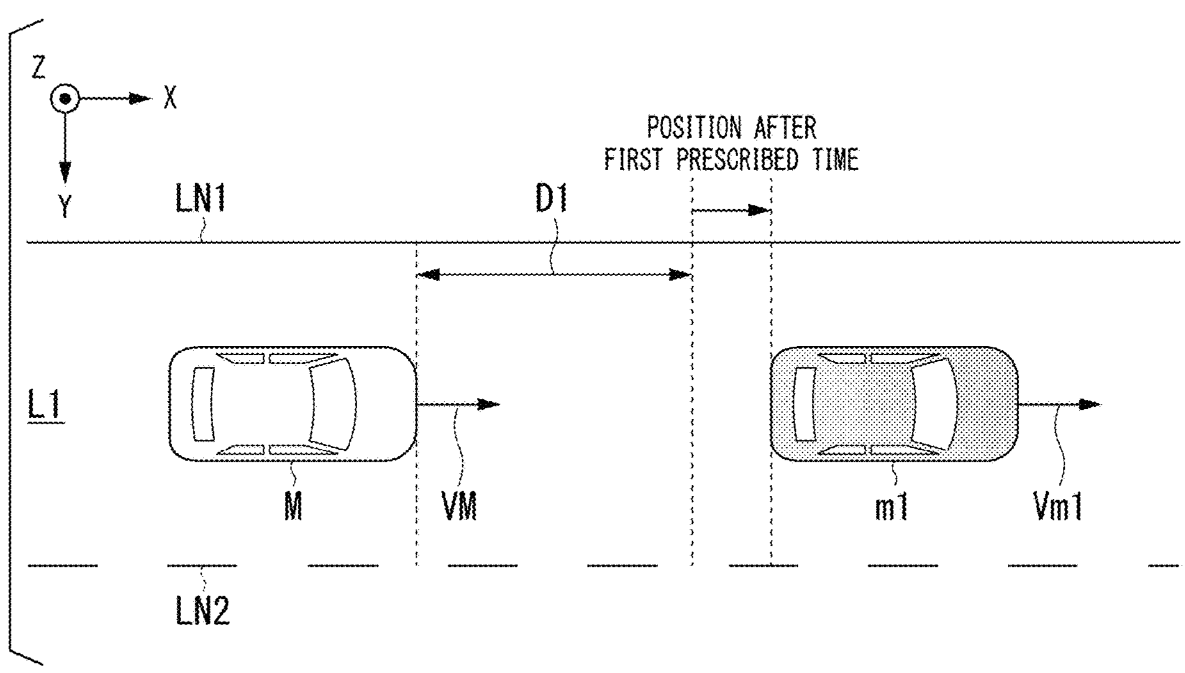
FIG. 4 is a diagram illustrating first activation determination of the alert control.

FIG. 4 is a diagram illustrating first activation determination for the alert control. An example of FIG. 4 illustrates a state of the host vehicle M and another vehicle m1 that travel on the lane L1 defined by the road markings LN1 and LN2. For example, as illustrated in FIG. 4, the controller 140 derives the contact margin value between the host vehicle M and another vehicle m1 assuming that the position of another vehicle m1 is present at a position after a first prescribed time, in deriving the time headway THW between the host vehicle M and another vehicle m1, and performs first determination about whether or not to execute contact avoidance control (for example, alert control), based on the derived contact margin value.

In the example of FIG. 4, the controller 140 assumes the position of another vehicle m1 after the first prescribed time based on the speed Vm1 of another vehicle m1 and calculates the time headway THW based on an inter-vehicle distance D1 between the assumed position and the host vehicle M and the speed VM of the host vehicle M. Then, the controller 140 determines to execute the alert control when the contact margin value based on the calculated time headway THW is less than the threshold, and determines not to execute the alert control when the contact margin value is equal to or greater than the threshold. In this way, according to the first determination, since the contact margin value is derived with a margin of a distance for the first prescribed time, it is possible to activate the alert control (slow deceleration control, centering steering control) with a certain amount of time to spare. Accordingly, it is possible to allow the occupant to more reliably recognize a dangerous situation. It is possible to early perform the alert control even in a situation in which the inter-vehicle distance is shortened unintentionally.

Second Activation Determination

Figure 5:
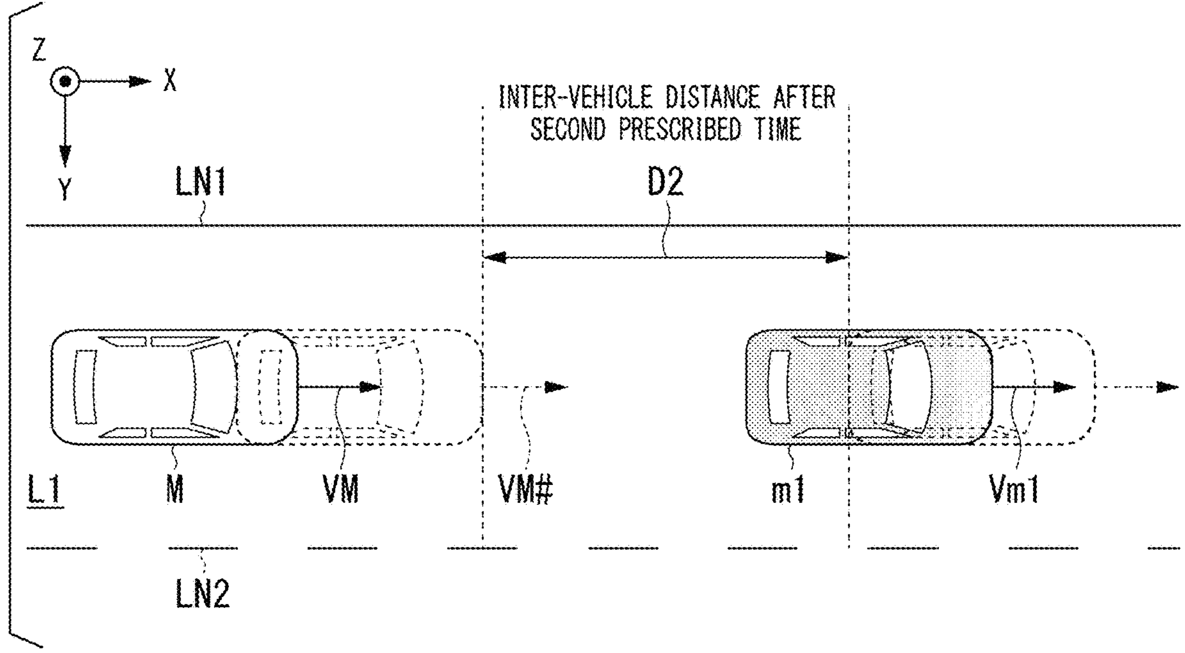
FIG. 5 is a diagram illustrating second activation determination of the alert control.

FIG. 5 is a diagram illustrating second activation determination for the alert control. In the second activation determination, an inter-vehicle distance D2 after a second prescribed time and a speed (a speed of VM # of the host vehicle M) are estimated based on the position and the speed VM of the host vehicle M and the position and the speed Vm1 of another vehicle m1 recognized by the recognizer 110, a contact margin value is derived based on an estimation result, and second determination about whether or not to execute contact avoidance control (for example, alert control), based on the derived contact margin value is performed. That is, the controller 140 calculates the time headway THW based on the inter-vehicle distance D2 after the second prescribed time and the speed VM # of the host vehicle M. Then, the controller 140 determines to execute the alert control when the contact margin value based on the calculated time headway THW is less than the threshold, and determines not to execute the alert control when the contact margin value is equal to or greater than the threshold. According to the second activation determination, for example, even when another vehicle m1 is rapidly decelerated, it is possible to reduce a possibility that vehicle control or notification is delayed.

Here, the second prescribed time is, for example, about 1 [second], but is not limited thereto. The first prescribed time is, for example, a time (for example, about 0.5 [second]) shorter than the second prescribed time. With this, since it is possible to restrain only the position of another vehicle m1 from being significantly displaced from an actual position, it is possible to perform more proper activation determination.

Returning to FIG. 2, when time T3 is reached at which the time to collision TTC (contact margin value) is less than a prescribed value (prescribed time) in a state in which the driver does not alert regarding the surroundings (override control) even when the above-described alert control is performed, and when detection is made that the driver performs distracted driving, contact warning control ((2) in the drawing) is performed. Time T3 is, for example, a time for the time to collision TTC of about 2 [second].

Figure 6:
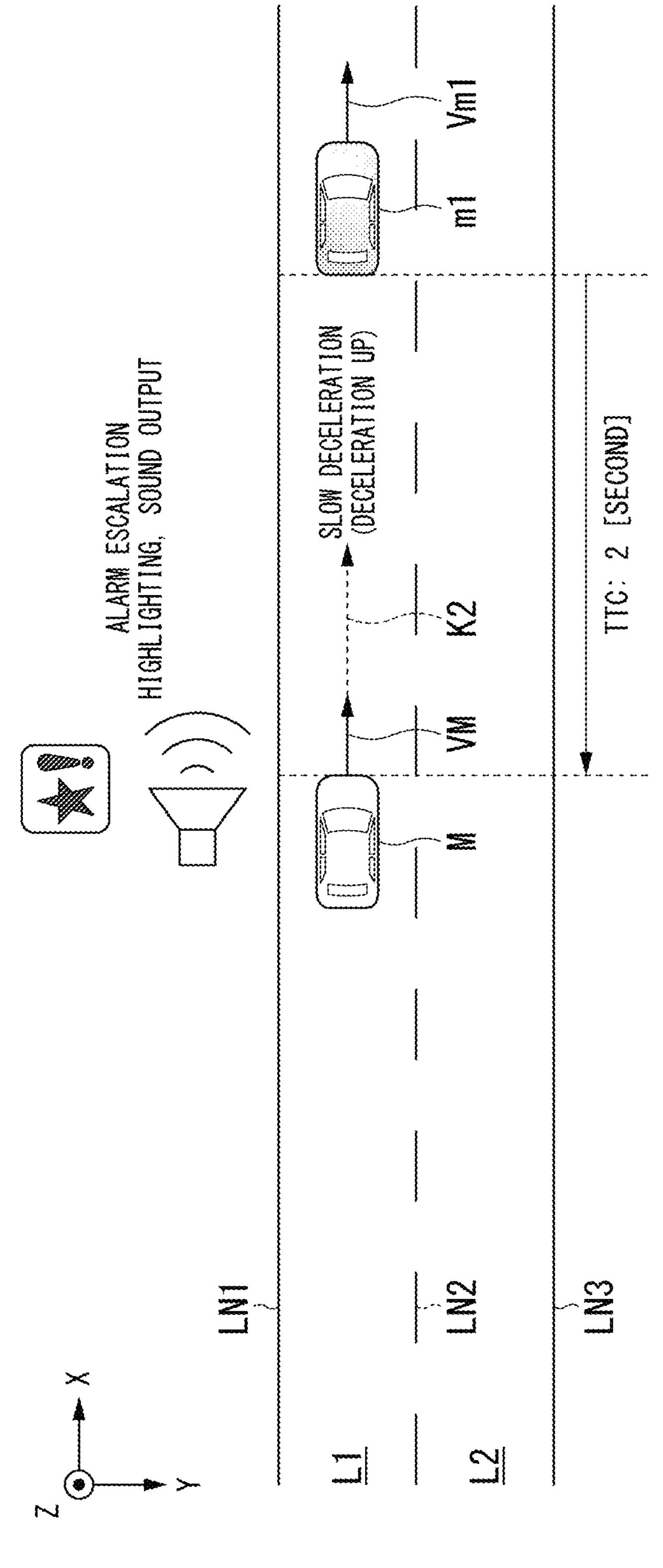
FIG. 6 is a diagram illustrating contents of contact warning control.

FIG. 6 is a diagram illustrating the contents of the contact warning control. FIG. 6 illustrates a scene where the time to collision TTC is 2 [second] in a situation in which there is no accelerator operation of the driver from the situation illustrated in FIG. 3. At a contact warning control stage, the slow deceleration controller 142A sets a target deceleration (second target deceleration) and executes slow deceleration control according to the set second target deceleration. A target trajectory K2 for executing the slow deceleration control may be generated, and control may be performed such that the host vehicle M travels along the generated target trajectory K2. The slow deceleration control that is executed in the contact warning control is control in a second deceleration state. In the second deceleration state, the slow deceleration controller 142A sets the target deceleration (second target deceleration) such that a load (vertical G) equal to or smaller than a second upper limit deceleration (about 0.2 [G]) and greater than the first upper limit deceleration is applied to the driver in the moving direction. With this, it is possible to make the driver more aware of the host vehicle M approaching another vehicle m1. In this way, since the deceleration control is performed while increasing the deceleration as necessary, it is possible to create more time for making the driver aware of another vehicle m1, and to allow the driver to drive for avoiding contact with another vehicle m1 with time to spare.

Figure 7:
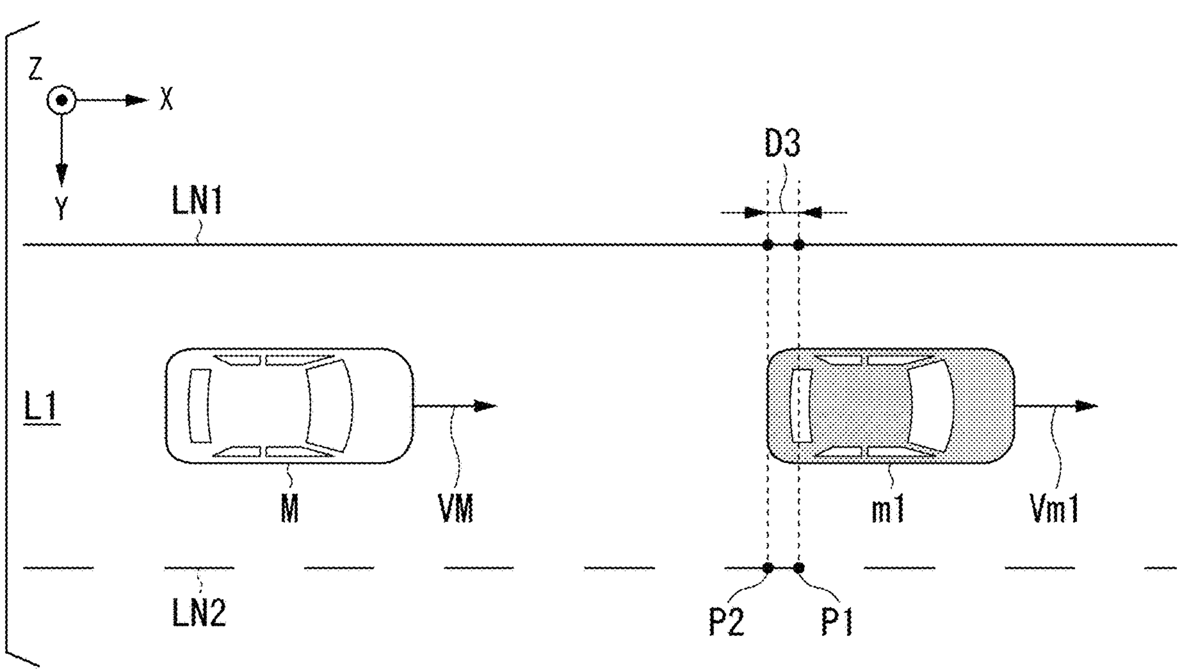
FIG. 7 is a diagram illustrating adjustment of a target position by the presence or absence of an accelerator operation.

Here, the slow deceleration controller 142A may adjust the above-described target deceleration or a position (for example, a target stop position of the host vehicle M) where deceleration by the target deceleration is completed according to whether or not an accelerator operation by the driver of the host vehicle M is detected based on the detection result of the AP sensor 84A, in performing deceleration by alert control or contact warning control. FIG. 7 is a diagram illustrating adjustment of a target position according to the presence or absence of an accelerator operation. For example, when the accelerator operation of the driver is detected, the slow deceleration controller 142A sets a position (first target position P1) slightly overlapping a main body region as another vehicle m1 is viewed from above (for example, several tens [cm] in front of a rear end), and sets the first target deceleration where deceleration is completed until the host vehicle M reaches a first target position P1. The first target position P1 is set behind another vehicle m1 in a front-rear direction. When the accelerator operation of the driver is not detected, a target position (second target position P2) is set behind the first target position P1 (in other words, the host vehicle M side or a front side as viewed from the host vehicle M), and the second target deceleration at which deceleration is completed until the host vehicle M reaches the second target position P2 is set. The slow deceleration controller 142A performs deceleration based on the above-described target deceleration, so that it is possible to suppress excessive deceleration, and to have the driver take control of a deceleration operation as much as possible.

In the contact warning control, as described above, the centering steering control by the centering steering controller 144A may be executed in addition to (or instead of) the slow deceleration control. In the contact warning control, the HMI controller 150 may perform control (alarm escalation control) such that an image of alert information displayed on the display 32 is highlighted or an alarm is output from the speaker 34. With this, it is possible to notify the driver that there is a high likelihood of contact while performing deceleration, to further clearly prompt the driver to be alert or perform a contact avoidance operation.

Figure 8:
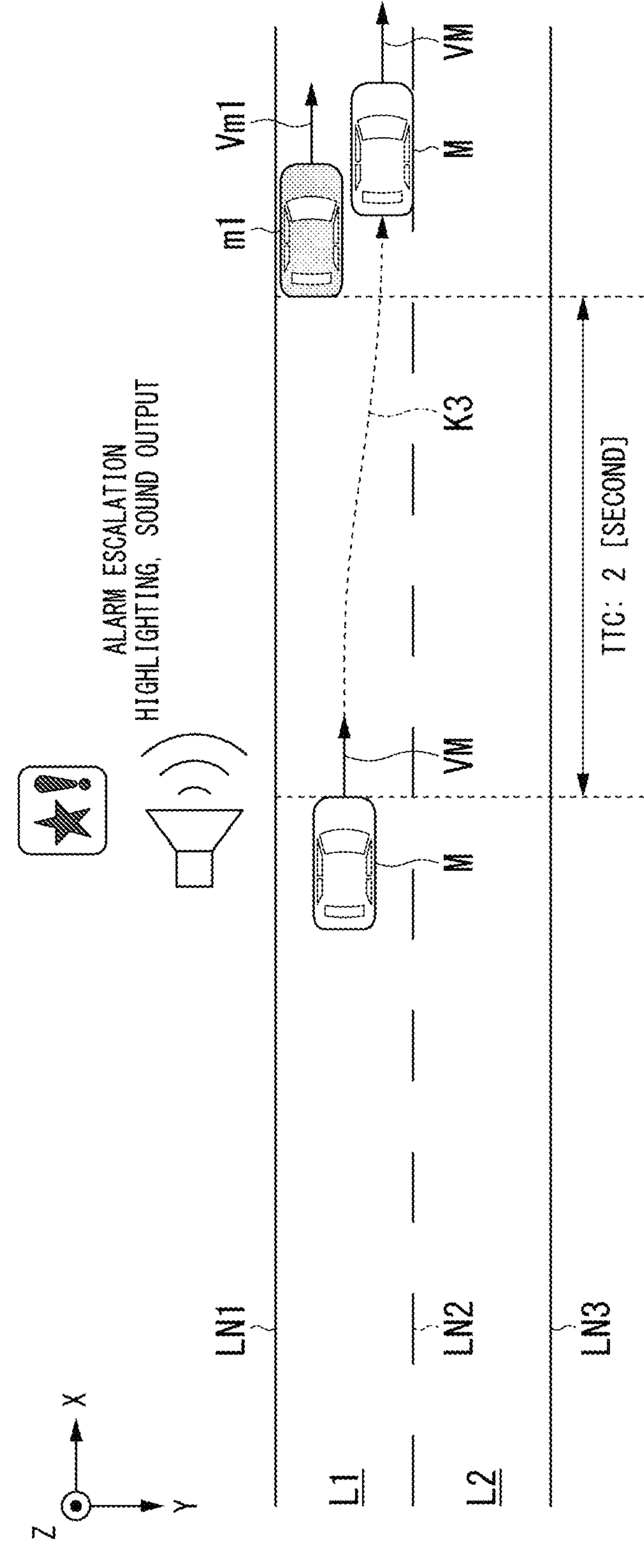
FIG. 8 is a diagram illustrating contents of automatic steering avoidance control.

Returning to FIG. 2, after the execution of the contact warning control, at time T4 at which determination is made that automatic avoidance can be performed in the traveling lane, the steering controller 144 executes automatic steering avoidance control ((3) illustrated in FIG. 2). FIG. 8 is a diagram illustrating the contents of the automatic steering avoidance control. In an example of FIG. 8, for example, control when the accelerator operation by the driver is not performed after the execution of the contact warning control is performed. In this case, when an avoidance space is present in the traveling lane based on the region of the traveling lane and the position of another vehicle m1, the contact avoidance steering controller 144B generates a target trajectory K3 for traveling on the avoidance space, and executes steering control (speed control as necessary) such that the host vehicle M travels along the generated target trajectory K3. The contact avoidance steering controller 144B may perform acceleration/deceleration control in addition to the steering control. In the automatic steering avoidance control, the HMI controller 150 may continuously execute the alarm escalation control described above. With this, it is possible to implement more proper vehicle control by executing the automatic steering control when steering avoidance can be performed by control with high safety.

At this timing, CMBS control by the contact avoidance braking controller 142B may be executed in parallel. When the CMBS control is executed, the automatic steering avoidance control described above or contact avoidance steering control described below may not be executed.

Returning to FIG. 2, at time T5 at which the driver operates the steering wheel 82 (a driver steering trigger is detected) to perform a steering operation in a direction of avoiding another vehicle m1, the contact avoidance steering controller 144B performs contact avoidance steering control such that the vehicle does not further depart from an adjacent lane (lane L2) adjacent to the traveling lane (lane L1) ((4) of FIG. 2). The contact avoidance steering control may be executed after the automatic steering avoidance control or may be executed after the contact warning control.

Figure 9:
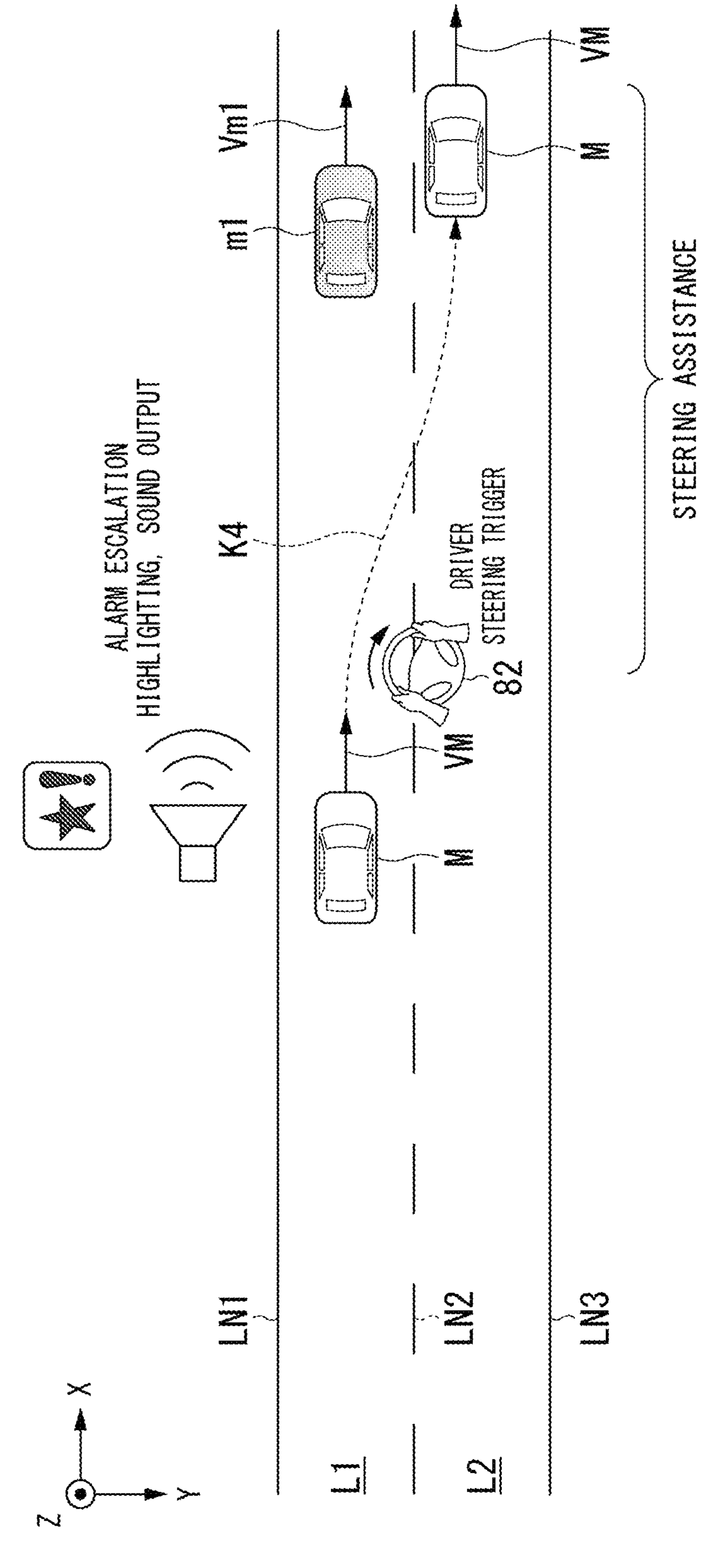
FIG. 9 is a diagram illustrating steering control after a driver steering trigger.

FIG. 9 is a diagram illustrating steering control after a driver steering trigger. In an example of FIG. 9, when a space for the host vehicle M to avoid contact with another vehicle m1 is not present on the lane L1, and when the driver steering trigger (a steering amount equal to or greater than a threshold of the steering wheel 82 by the driver) is detected, the contact avoidance steering controller 144B permits the host vehicle M to move from the lane L1 to the adjacent lane L2, and performs steering control of the host vehicle M not to further depart from the adjacent lane L2. For example, a target trajectory K4 for lane change to the lane L2 is generated, and steering assistance is performed such that the position of the host vehicle M is close to the target trajectory K4 by a steering operation by the driver. In the contact avoidance steering control, the MI controller 150 may continuously execute the alarm escalation control described above. With this, it is possible to implement more proper vehicle control after emergency avoidance steering is performed by the steering operation of the driver.

When the time to collision TTC is close to a limit value immediately after the alert control illustrated in (1) of FIG. 2, and the driver performs the steering operation, similarly to the control of (4) of FIG. 2, the controller 140 executes contact avoidance steering control (driver steering assistance control) such that the vehicle does not further cross the adjacent lane ((5) of FIG. 2). In this case, the HMI controller 150 may perform notification control such as notification or alarm that steering assistance is activated.

In each activation phase of the alert, the contact caution alarm, the automatic steering avoidance, and contact avoidance steering, a condition regarding the speed of the host vehicle M may be taken into account as a determination condition for activation. FIG. 10 is a diagram illustrating the condition of the speed of the host vehicle M for starting control for each activation phase. For example, for the contact avoidance steering control in the automatic steering avoidance or the contact avoidance steering (steering assistance), a condition that the speed VM of the host vehicle M is 40 [km/h] or higher is one of activation start conditions. Since this control is control after the alert, when the time to collision TTC is about 2 [second], contact avoidance can be sufficiently performed by a brake operation of the driver. The centering steering control in the alert and the contact caution alarm may be controlled to be executed when the speed VM of the host vehicle M is 30 [km/h] or higher. When there is the accelerator operation (AP operation), the slow deceleration control in the alert and the contact caution alarm is controlled to be executed when the speed VM of the host vehicle M is 30 [km/h] or higher. Since this speed falls below a steering avoidance limit speed and is within a range in which there is a margin in performance of the CMBS control, it is possible to implement more proper driving control by setting this condition. When there is no AP operation, the slow deceleration control is controlled to be executed when the speed VM of the host vehicle M is 5 [km/h] or higher. That is, when the AP operation of the driver is not detected, the speed is set to be lower than when the AP operation is detected. With this, by relaxing the start condition for the slow deceleration control in a situation in which there is no AP operation, it is possible to execute the slow deceleration control in various situations including distracted driving during congestion, and to more safely avoid contact between the host vehicle M and another vehicle m1.

Override Control

Figure 11:
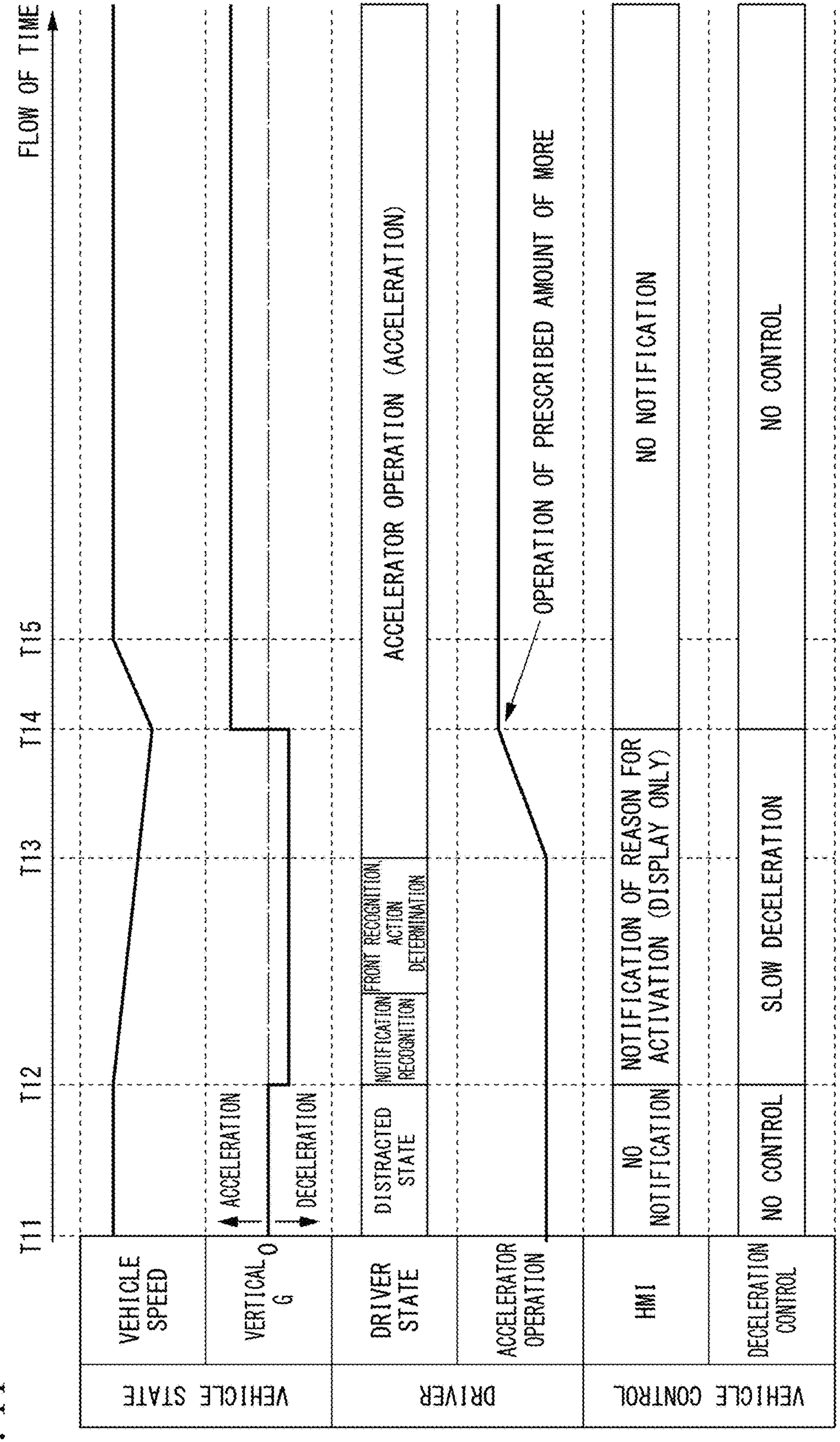
FIG. 11 is a diagram illustrating an example of contents of override control to slow deceleration control.

The slow deceleration control in the alert or the contact caution alarm described above may be stopped by a prescribed operation by the driver in the middle of the slow deceleration control. In the following description, description will be provided while referring to the above-described contents as override control to slow deceleration. FIG. 11 is a diagram illustrating an example of the contents of the override control to the slow deceleration control. In the example of FIG. 11, as illustrated in FIG. 3 and the like, when the host vehicle M and another vehicle m1 as a preceding vehicle are present on the lane L1, the state of the host vehicle M, the driver, and the vehicle control is illustrated according to a flow of time. In the example of FIG. 11, it is assumed that time T11 is earliest, and T12, T13, T14, and T15 are later than time T1 in that order.

In a period of time T11 to T12 illustrated in FIG. 11, determination is made that the driver is in a distracted state. In this period, the driver performs the accelerator operation, and the host vehicle M is traveling at a constant speed (vertical G is 0 (zero)). Information is not output to the HMI 30, and the deceleration control is not executed.

After time T12, since an execution condition for the slow deceleration control is satisfied, the controller 140 performs the slow deceleration control. In this case, in the host vehicle M, the vertical G is generated in the slow deceleration. At this stage, notification of an activation reason (image display only) is output to the HMI 30. In the example of FIG. 11, the driver feels the vertical G by the slow deceleration with a body and recognizes the notification contents output on the HMI 30 to recognize the front of the host vehicle M or determines a next action (driving operation).

At time T13, the driver executes an accelerator operation to accelerate the host vehicle M during the execution of the slow deceleration control. At this point of time, since an accelerator operation of a prescribed amount or more is not executed, the slow deceleration control continues, and the activation reason notification by the HMI 30 is continuously output. Then, at time T14 at which the accelerator operation of a prescribed amount or more is executed, the slow deceleration controller 142A stops the slow deceleration control. Thereafter, since the host vehicle M is accelerated according to an accelerator operation degree by manual driving of the driver, the vertical G according to acceleration is generated. With this, the override control to the slow deceleration is executed. In the example of FIG. 11, since the accelerator operation after time T14 is constant, the host vehicle M is accelerated to a speed corresponding to the accelerator operation after override and is at a constant speed at a time (time T15) at which the speed VM is a speed corresponding to the accelerator operation degree. After the override control is executed, the notification such as alert or alarm from the HMI 30 ends, and the slow deceleration control is not executed until an execution condition of next slow deceleration is satisfied.

While the braking controller 142 stops the slow deceleration control when an accelerator operation of a prescribed value or more is detected by the driving state detector 120, the above-described prescribed value may be changed according to the speed of the accelerator operation.

Figure 12:
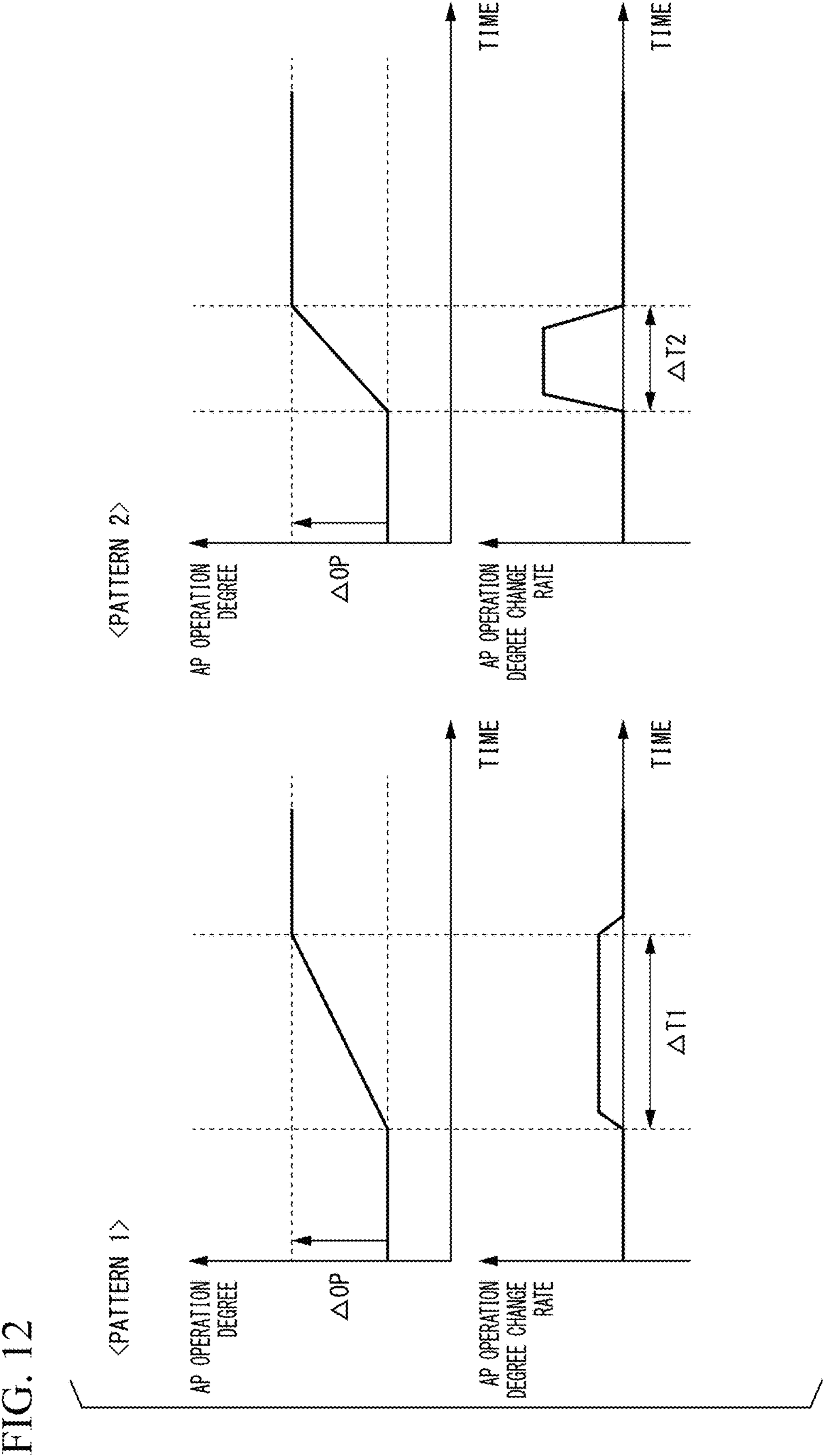
FIG. 12 is a diagram illustrating a relationship between an operation degree of an accelerator pedal and a change rate in override determination.

FIG. 12 is a diagram illustrating a relationship between an operation degree of the accelerator pedal 84 and a change rate in override determination. In an example of FIG. 12, an AP operation degree and an AP operation degree change rate in two patterns are illustrated. In each pattern, the horizontal axis indicates time, and the vertical axis indicates an AP operation degree and an AP operation degree change rate. For example, in a pattern 1, when the accelerator operation is performed at a prescribed operation degree ΔOP (for example, about 3 to 5 [%]) using time ΔT1 of about 3 to 4 [second], it can be considered that there is no intention to stop the slow deceleration control being executed. In contrast, as illustrated in a pattern 2, when the accelerator operation is performed at a prescribed operation degree ΔOP at a time ΔT2 (for example, short time of about 1 [second]), this is considered to reaction to the slow deceleration control. Based on the above-described way of thinking, determination is performed whether or not to perform the override control to the slow deceleration control with a change rate when the accelerator operation is performed at a prescribed operation degree for a prescribed time, as a reference.

For example, the braking controller 142 performs override determination when the AP operation degree change rate is equal to or greater than a prescribed value (for example, based on whether or not there is an operation of an AP operation amount 3 to 5 [%] at 0.5 to 1 [second]), as the pattern 2. The braking controller 142 may execute the override control when an AP operation amount increases to 10 to 20 [%] or more with an AP operation degree at the time of the start of the control as a reference without depending on the AP operation degree change rate. The braking controller 142 may change a threshold for determining whether or not to perform the override control, according to the deceleration of the slow deceleration. In this case, the smaller the deceleration, the smaller the threshold (or the greater the deceleration, the greater the threshold). The braking controller 142 may determine whether or not to perform the override control based on whether or not an ALP operation degree change rate or an AP operation degree that generates an acceleration necessary for cancelling deceleration by slow deceleration is generated.

The braking controller 142 sets the prescribed value to be small when the speed at which the driver performs the accelerator operation is equal to or higher than a prescribed speed, and may set the prescribed value to be great when the speed at which the driver performs the accelerator operation is lower than the prescribed speed. In this way, it is possible to perform more suitable override determination in slow deceleration by determining the intention of the driver from the accelerator operation speed of the driver. By performing override determination when the AP operation degree change rate is equal to or greater than the prescribed value (3 to 5%), it is possible to perform override determination in a short time, and to cope with a person who performs the AP operation quickly. By performing override determination when the AP operation amount increases to 10 to 20% with the AP operation degree at the time of the start of the control as a reference (10 to 20%), it is possible to perform override determination even when override determination cannot be performed by the AP operation in a short time. With this, it is possible to cope with a person who performs the AP operation slowly. Since the determination threshold is changed according to the deceleration by changing the determination threshold for override according to the deceleration (for example, target deceleration) of the slow deceleration (by decreasing the threshold as the deceleration decreases or increasing the threshold as the deceleration increases), it is possible to meet a driving feeling of the driver.

First Embodiment: Processing Flow

Figure 13:
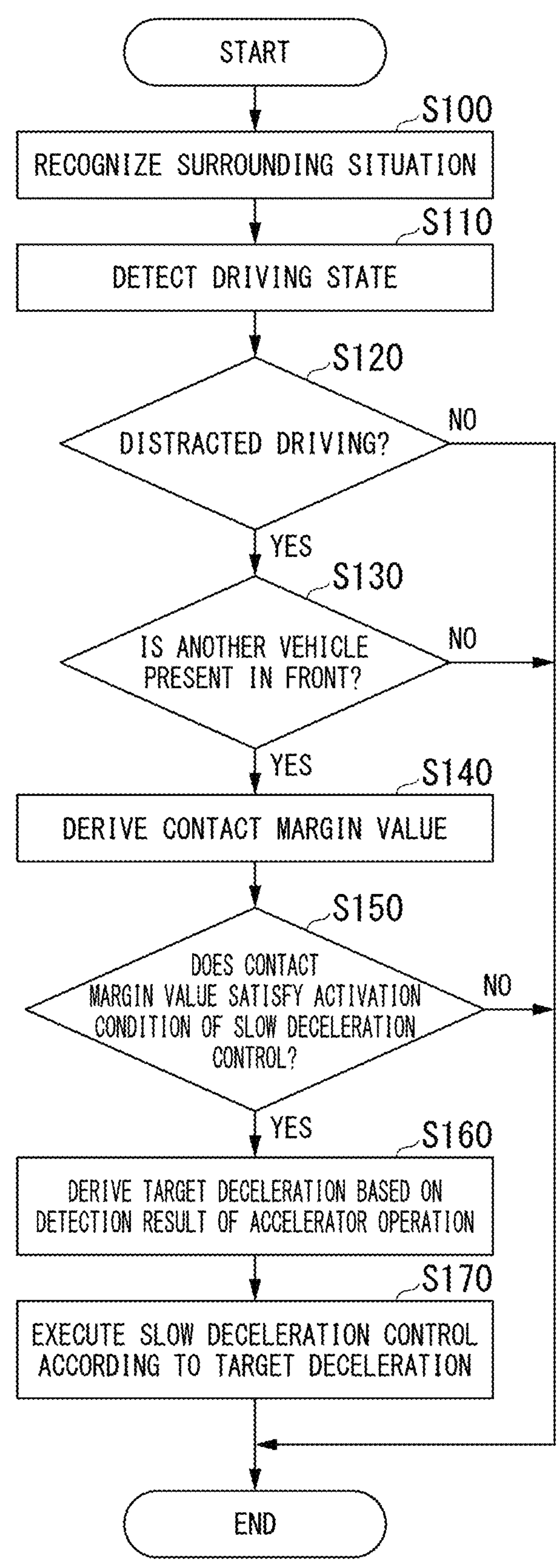
FIG. 13 is a flowchart illustrating an example of processing that is executed by a driving assistance device in the first embodiment.

FIG. 13 is a flowchart illustrating an example of processing that is executed by the driving assistance device 100 in the first embodiment. In the example of FIG. 13, in the processing that is executed by the driving assistance device 100, in particular, processing regarding the slow deceleration control will be described.

In the example of FIG. 13, the recognizer 110 recognizes the surrounding situation of the host vehicle M (Step S100). Next, the driving state detector 120 detects the driving state of the occupant (driver) of the host vehicle M (Step S110). The driving state detector 120 determines whether or not the driving state of the driver is distracted driving (Step S120). When determination is made that the driving state of the driver is distracted driving, the contact likelihood determiner 130 determines whether or not another vehicle m1 (an example of an obstacle) is present in front of the host vehicle M (Step S130). When determination is made that another vehicle m1 is present in front, the contact margin value between the host vehicle M and another vehicle m1 is derived (Step S140). Details of the processing of Step S140 will be described below.

Next, the slow deceleration controller 142A determines whether or not the contact margin value satisfies the activation condition of the slow deceleration control (in other words, the execution condition for the alert control) (Step S150). When determination is made that the activation condition is satisfied, the target deceleration is derived based on the detection result of the accelerator operation of the driver detected by the driving state detector 120 (Step S160). Next, the slow deceleration controller 142A executes the slow deceleration control according to the derived target deceleration (Step S170). With this, the processing of the present flowchart ends. When determination is made in the processing of Step S120 that the driving state of the driver is not distracted driving, when determination is made in the processing of Step S130 that another vehicle is not present in front, and when determination is made in the processing of Step S150 that the contact margin value does not satisfy the activation condition of the slow deceleration control, the processing of the present flowchart ends.

Figure 14:
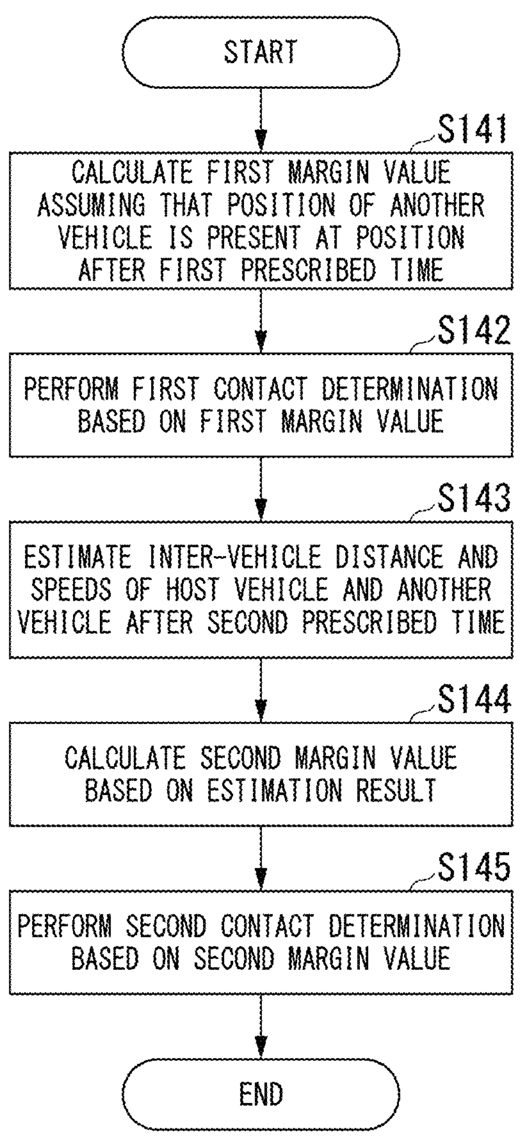
FIG. 14 is a flowchart illustrating an example of derivation processing of a contact margin value.

FIG. 14 is a flowchart illustrating an example of derivation processing of the contact margin value. The processing illustrated in FIG. 14 illustrates details of the processing of Step S140. In the processing of FIG. 14, the contact likelihood determiner 130 calculates the contact margin value (first margin value) between the host vehicle M and another vehicle m1 in a state in which the position of another vehicle m1 is set to the position after the first prescribed time (Step S141). Next, the contact likelihood determiner 130 performs first contact determination about whether or not the host vehicle M and another vehicle m1 come into contact with each other, based on the first margin value (Step S142). Next, the contact likelihood determiner 130 estimates of the inter-vehicle distance between the host vehicle M and another vehicle m1 after the second prescribed time and the relative speed (Step S143), calculates the contact margin value (second margin value) between the host vehicle M and another vehicle m1 based on the estimation result (Step S144), and performs second contact determination about whether or not the host vehicle M and another vehicle m1 come into contact with each other, based on the calculated second margin value (Step S145). In the derivation processing of the contact margin value, only one of the processing (first processing) of Steps S141 and S142 and the processing (second processing) of Steps S143 to S145 may be performed. When both the first processing and the second processing are carried out, the first prescribed time may be set to a time shorter than the second prescribed time.

Figure 15:
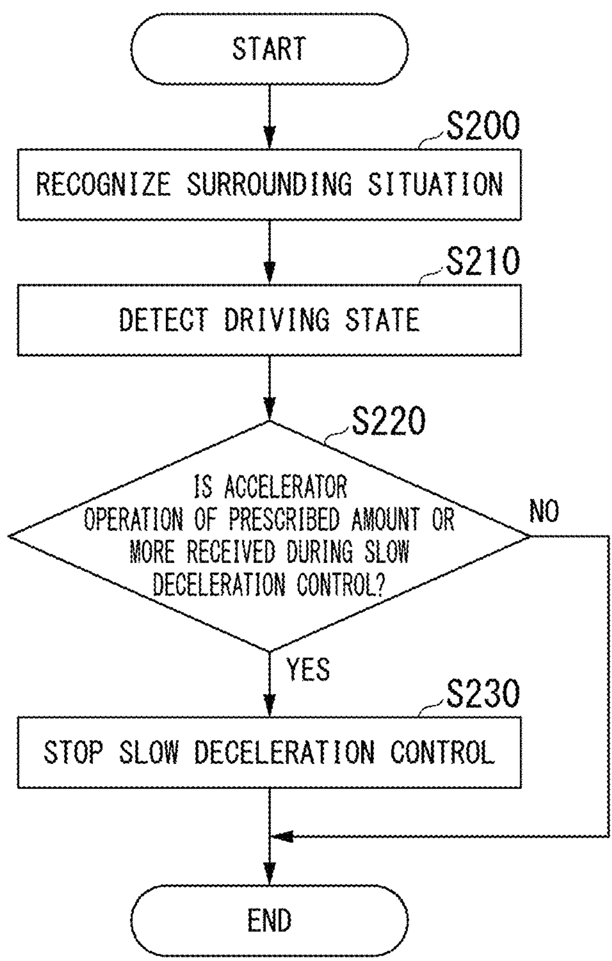
FIG. 15 is a flowchart illustrating an example of override control processing to slow deceleration control.

FIG. 15 is a flowchart illustrating an example of override control processing to slow deceleration control. In the example of FIG. 15, the recognizer 110 recognizes the surrounding situation of the host vehicle M (Step S200). Next, the driving state detector 120 detects the driving state of the driver (Step S210). Next, the slow deceleration controller 142A determines whether or not the accelerator operation of a prescribed amount or more is received during slow deceleration (Step S220). When determination is made that the accelerator operation of a prescribed value or more is received, the slow deceleration control is stopped (Step S230). With this, the processing of the present flowchart ends. When determination is made in the processing of Step S220 that the accelerator operation of the prescribed value or more is not received during the slow deceleration control, the processing of the present flowchart ends. The prescribed amount in the processing of Step S220 may be adjusted according to, for example, the accelerator operation speed of the driver.

As described above, according to the first embodiment, it is possible to perform more proper vehicle control for the occupant according to the surrounding situation of the vehicle. For example, according to the first embodiment, in the alert control, by changing the target deceleration according to whether or not the accelerator operation of the driver is detected and performing the slow deceleration control according to the changed target deceleration, it is possible to transmit approach to an obstacle to the occupant, and to prompt the occupant to be alert or perform the deceleration operation. According to the first embodiment, in the contact warning control, by further increasing the degree of deceleration, it is possible to make the occupant recognize a high likelihood of contact with an obstacle while performing deceleration, and to prompt the occupant to perform the deceleration operation. According to the first embodiment, by performing the slow deceleration control at the time of distracted driving of the driver, it is possible to suppress unnecessary alert, and to implement vehicle control to the driver more properly.

According to the first embodiment, for example, it is possible to determine the intention of the occupant from the AP operation speed of the driver to perform more proper override determination by changing the override threshold depending on the operation speed of the accelerator pedal 84 during the slow deceleration control activated before the CMBS control is activated. According to the first embodiment, it is possible to perform determination in a short time by performing override determination according to the operation degree change rate of the accelerator pedal, and to cope with a driver who quickly performs an AP operation. According to the first embodiment, it is possible to cope with a driver who performs an AP operation slowly by executing override control when an operation amount increases by a prescribed amount or more with the operation degree of the accelerator pedal 84 at the time of the start of the slow deceleration control as a reference. According to the first embodiment, since the determination threshold is changed according to the deceleration, it is possible to perform override determination that meets a driving feeling of the driver.

According to the first embodiment, by revising the position of the preceding vehicle to the position after the first prescribed time in the time headway between the host vehicle and the preceding vehicle to derive the time to collision, when the relative speed is the same and the inter-vehicle distance is short, even when the preceding vehicle is rapidly decelerated, it is possible to activate slow deceleration or centering with time to spare. It is possible to make the occupant to early recognize a dangerous situation. By estimating the inter-vehicle distance between the host vehicle and the preceding vehicle after the second prescribed time and the relative speed, and calculating the time to collision based on the estimation result, when the preceding vehicle is rapidly decelerated, it is possible to reduce a possibility that vehicle control or notification is delayed. With this, it is possible to cope with deceleration of the preceding vehicle in a state in which the inter-vehicle distance is short, and to cope with rapid deceleration of the preceding vehicle in a state in which the inter-vehicle distance is short.

Second Embodiment

In the first embodiment described above, while the description has been provided primarily focusing on the deceleration control for avoiding contact with an object, in a second embodiment, description will be provided primarily focusing on steering control of the host vehicle M. In the second embodiment, a configuration similar to the host vehicle M described in the first embodiment can be applied. Accordingly, in the following description, it is assumed that the functional configuration of the host vehicle M illustrated in FIG. 1 is used, and specific description thereof will not be repeated.

In the second embodiment, the centering steering controller 144A executes the centering steering control for steering the host vehicle M toward the center of the traveling lane when the recognizer 110 determines that an obstacle (for example, another vehicle m1) is present in front of the host vehicle M. Hereinafter, an example regarding the centering steering control will be divided into several parts and described.

First Example

Figure 16:
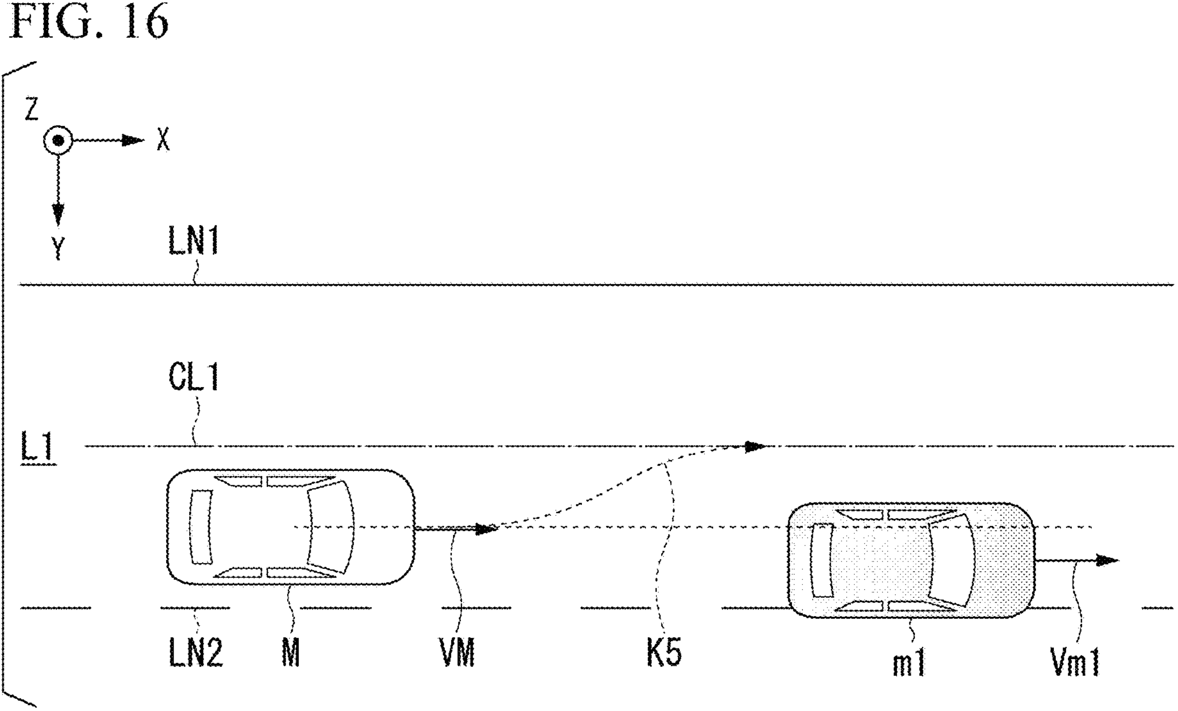
FIG. 16 is a diagram illustrating a first example of centering steering control in a second embodiment.

FIG. 16 is a diagram illustrating a first example of the centering steering control in the second embodiment. In an example of FIG. 16, the host vehicle M and another vehicle m1 as a preceding vehicle that travel on the lane L1 defined by the road markings LN1 and LN2 are illustrated. For example, the centering steering controller 144A generates a target trajectory K5 for positioning the host vehicle M to a lane center CL1 when approaching the obstacle in front, and performs steering control such that the host vehicle M travels along the generated target trajectory K5.

In this way, by steering the host vehicle M to the lane center CL1, when the driver is not aware of the obstacle in front, it is possible to make the driver aware of the obstacle in front by a change of a behavior of the host vehicle M in a horizontal direction (a width direction of the traveling lane), and to contribute to avoiding contact with the obstacle in front. Since the steering control in the alert control is a behavior for prompting the driver to monitor the surroundings, the steering control in the alert control becomes control different from the steering control for the host vehicle M to avoid from another vehicle m1. Note that, in the steering control of the first example, since the host vehicle M is steered in a direction away from another vehicle m1, the driver easily performs subsequent avoidance driving.

Second Example

Figure 17:
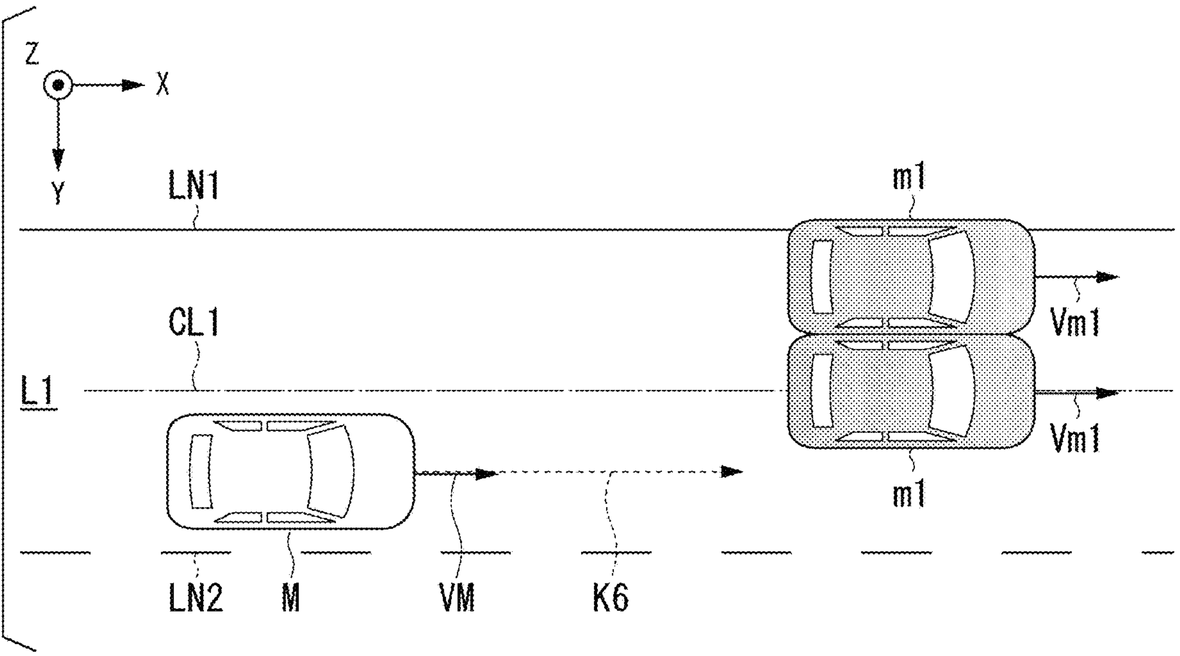
FIG. 17 is a diagram illustrating a second example of centering steering control in the second embodiment.

FIG. 17 is a diagram illustrating a second example of the centering steering control in the second embodiment. In an example of FIG. 17, a case where another vehicle m1 is present near the lane center CL1 or on an opposite side of the lane center CL1 from the host vehicle M (in the same lane outside of the lane center CL) as viewed from the host vehicle M is schematically illustrated. In this case, the centering steering controller 144A does not perform steering control of moving the host vehicle M to the lane center CL. In this case, the controller 140 may generate a target trajectory K6 for making the host vehicle M travel along the marking LN2 closer to the host vehicle M out of the road markings LN1 and LN2, and may perform control such that the host vehicle M travels along the generated target trajectory K6. In this case, the controller 140 may execute LKAS control such that the host vehicle M does not depart from the traveling lane. In the second example, when the steering control of moving the host vehicle M to the center of the traveling lane is not executed, the controller 140 may execute the deceleration control (for example, slow deceleration control) of the host vehicle M.

Third Example

Figure 18:
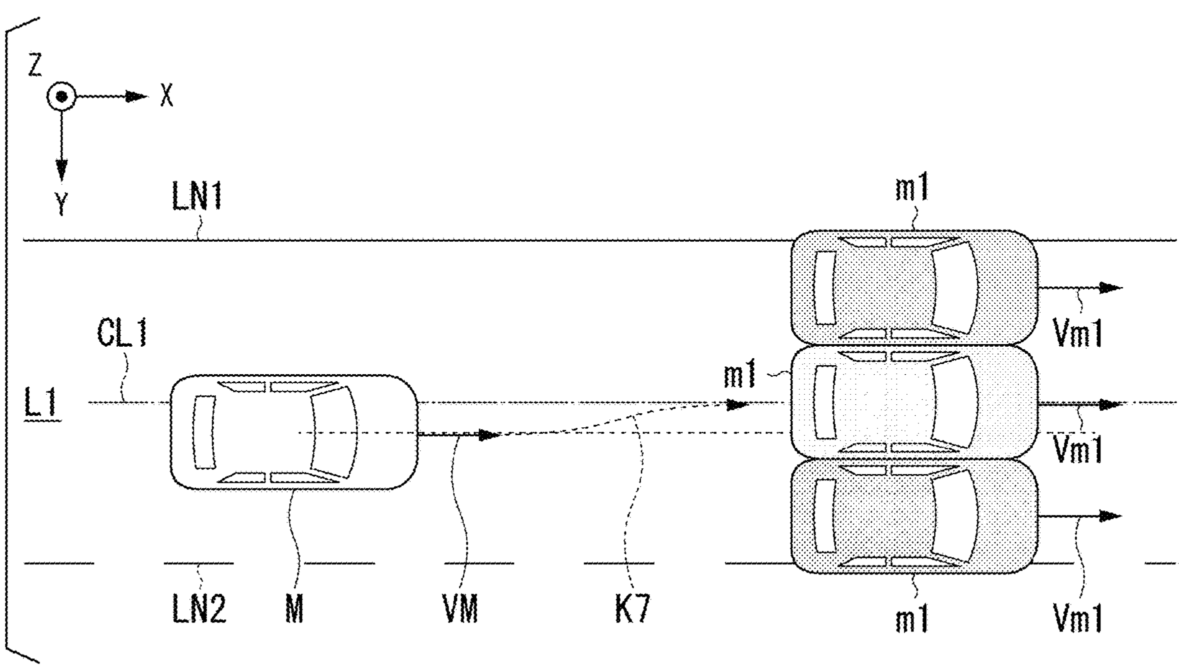
FIG. 18 is a diagram illustrating a third example of centering steering control in the second embodiment.

FIG. 18 is a diagram illustrating a third example of the centering steering control in the second embodiment. As illustrated in FIG. 18, in the third example, even in a case where another vehicle m1 is at any position (near the lane center or near each of the road markings for defining the lane L1) on the lane L1, when the host vehicle M is present within a lane center error range, the centering steering controller 144A generates a target trajectory K7 for moving the host vehicle M to the lane center CL1 and performs steering control such that the host vehicle M travels along the generated target trajectory K7. In this way, it is possible to make the driver aware of the presence of the preceding vehicle by a behavior of horizontal movement of the host vehicle M.

Fourth Example

Figure 19:
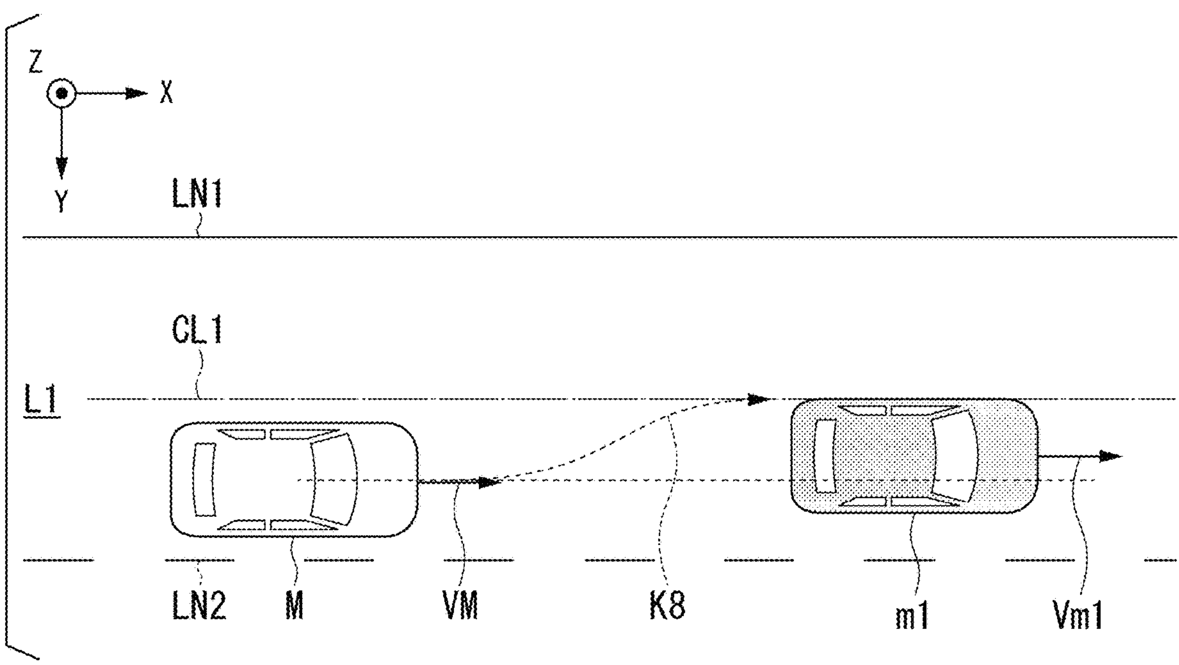
FIG. 19 is a diagram illustrating a fourth example of centering steering control in the second embodiment.

FIG. 19 is a diagram illustrating a fourth example of the centering steering control in the second embodiment. In the fourth example, when another vehicle m1 is present within a prescribed range (error range) with respect to the host vehicle M in the width direction of the traveling lane, steering control of moving the host vehicle M toward the center of the traveling lane is executed. As illustrated in FIG. 19, in the fourth example, when the horizontal positions of the host vehicle M and another vehicle m1 are close to each other (when a relative relationship cannot be determined), the centering steering controller 144A generates a target trajectory K8 such that the host vehicle M moves toward the lane center CL1, and controls steering or the like of the host vehicle M such that the host vehicle M travels along the generated target trajectory K8.

In the fourth example, the host vehicle M is positioned to the lane center CL1, and as a result, the host vehicle is steered in a direction approaching another vehicle m1; however, the steering control in the alert is intended for making the driver aware of another vehicle, and is different from the steering control of avoiding contact with another vehicle m. By performing this control, the host vehicle M is positioned to the center of the lane L1 at a time at which the driver is made aware of another vehicle. Thus, in subsequent manual driving, it is possible to allow the driver to easily select any of right and left directions and to perform a steering operation as well as deceleration.

Centering Determination

Figure 20:
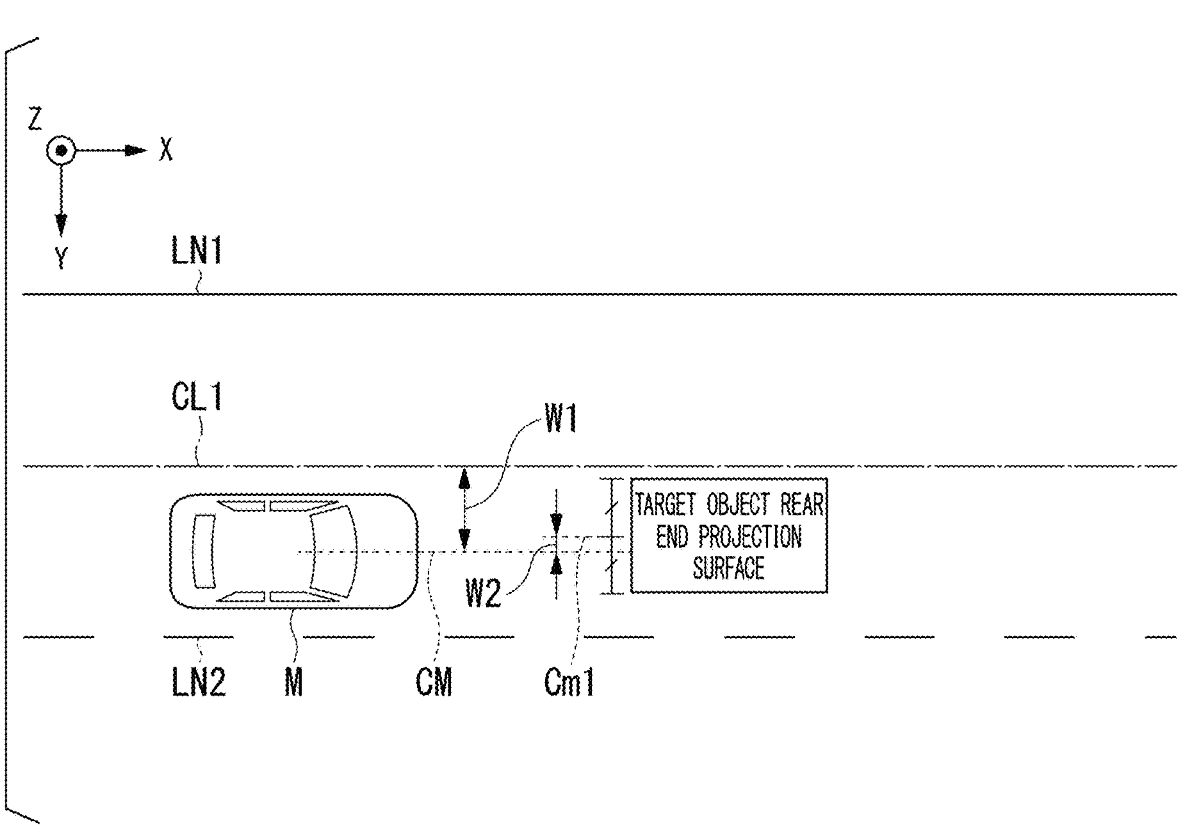
FIG. 20 is a diagram illustrating a way of thinking based on horizontal positions of a target object and a host vehicle.

Here, a positional relationship between the host vehicle M and a target object (another vehicle or the lane center) in the horizontal direction (the width direction of the traveling lane) for determining whether or not to execute the centering steering control will be described. FIG. 20 is a diagram illustrating a way of thinking based on the horizontal positions of the target object and the host vehicle M. In an example of FIG. 20, a relationship of horizontal positions on the road of a rear end projection surface of the target object such as another vehicle and the position of the host vehicle M is illustrated. A lane center error range is set, for example, in such a manner that a distance W1 of horizontal positions of a center CM of the host vehicle M and the lane center CL1 is about 0.3 to 0.5 [m] right and left from the lane center CL1. This is because it is considered that the host vehicle M is present near the lane center CL1 in a general lane when the distance W1 is up to about 0.5 [m]. Note that the host vehicle M is likely to lean toward any road marking at 0.5 [m]. For this reason, when the distance W1 is within about 0.3 [m], determination is made that the host vehicle M is present within the lane center error range.

For an error range of the center CM of the host vehicle M and a center Cm1 of the target object, when a distance W2 is within 0.2 to 0.3 [m], determination is made that the horizontal positions of the host vehicle M and the target object are close to each other, and the host vehicle M is steered to the lane center CL1. Here, in the steering control, the host vehicle M may be staggered in a range of ±0.2 [m], and an error also occurs in external recognition accuracy. Accordingly, it is considered that a region where a horizontal deviation of the host vehicle M and the target object is about 0.2 [m] cannot be used for determination, and the distance W2 is set with a lower limit value of 0.2 [m]. When this value increases, the target object is apparently positioned within a range overlapping the host vehicle M horizontally and centering is performed on the target for which centering is not required. Thus, by setting the distance W2 for determining whether or not the horizontal positions are close to each other, with about 0.3 [m] as an upper limit, it is possible to perform more proper determination.

Override Control to Centering Steering Control

Figure 21:
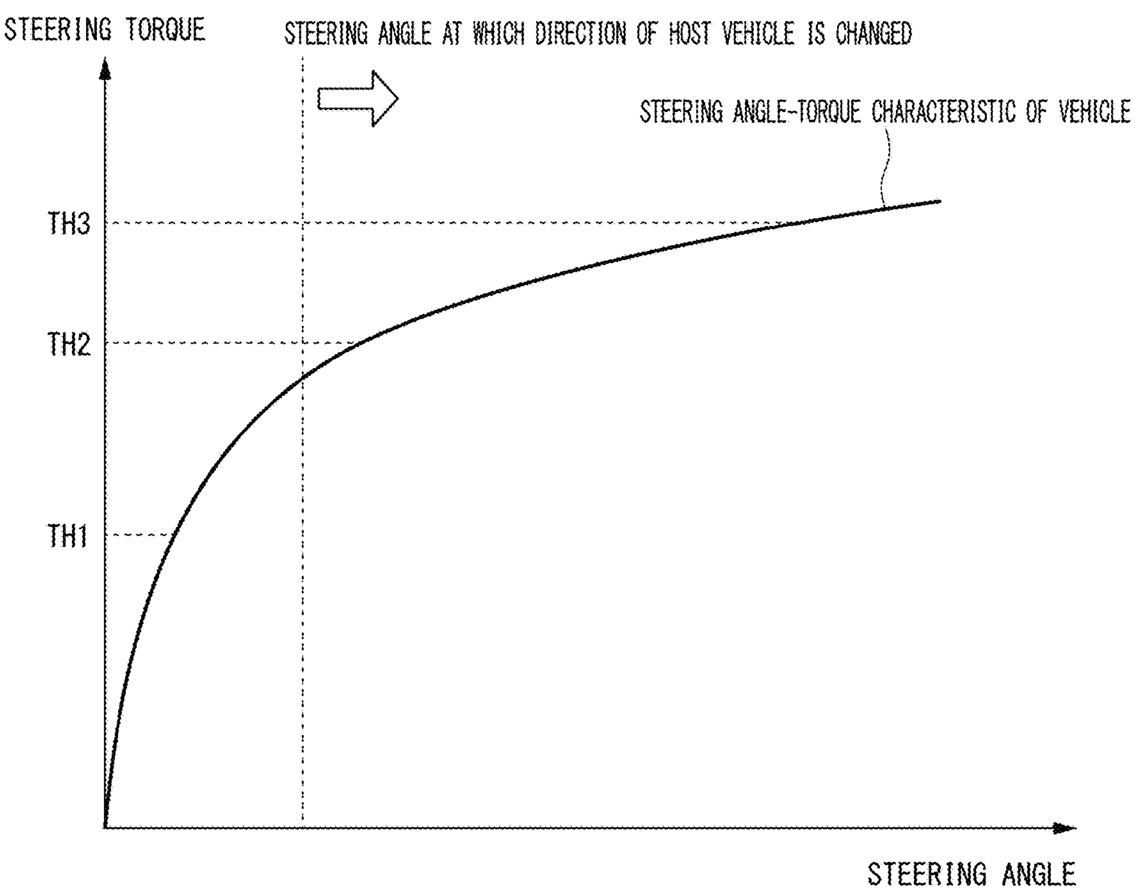
FIG. 21 is a diagram illustrating a condition for executing override control during the centering steering control.

In the centering steering control described above, when a prescribed condition is satisfied by a steering operation of the driver during execution, the centering steering control may be stopped and may be switched to manual driving of the driver. Hereinafter, the contents of override control to the centering steering control will be specifically described. FIG. 21 is a diagram illustrating a condition for executing the override control during the centering steering control. In an example of FIG. 21, a relationship between a steering angle of the host vehicle M and a torque characteristic of the steering wheel 82 is illustrated, the horizontal axis indicates the steering angle of the host vehicle M, and the vertical axis indicates a torque amount (steering torque) of the steering wheel 82. In the example of FIG. 21, a determination threshold TH1 for determining distracted driving, a determination threshold TH2 (an example of a first threshold) for override to steering in a forward direction during the centering steering control, and a determination threshold TH3 (an example of a second threshold) for override to steering in a backward direction (opposite direction) during the centering steering control are illustrated. The forward direction indicates, for example, a case where a direction of the torque amount (steering torque) of the steering wheel 82 and a rotation direction of the steering wheel 82 are the same direction. The backward direction indicates, for example, a case where the direction of the torque amount (steering torque) of the steering wheel 82 and the rotation direction of the steering wheel 82 are opposite directions.

For the threshold TH1 for determining distracted driving, steering torque smaller than a steering angle at which the direction of the host vehicle M is changed is set as a threshold. With this, it is possible to determine distracted driving before the direction of the host vehicle M is changed.

During the centering steering control, the centering steering controller 144A executes override control of stopping the centering steering control when the steering torque (steering amount) of the driver is equal to or greater than the threshold. In determination (hereinafter, referred to as override determination) for executing the override control, the centering steering controller 144A changes the above-described threshold according to whether a steering direction of the driver is a forward direction or a backward direction with respect to steering by the centering steering control. In this way, it is possible to perform more suitable override determination during the centering steering control by performing the override determination in consideration of the intention of the driver from the steering direction of the steering wheel 82 of the driver.

For example, as the determination threshold TH2 in forward steering, a determination threshold smaller than the determination threshold TH3 in forward steering is set. With this, it is possible to consider the intention of the driver contrary to the centering steering control, and to perform more proper override determination in centering. The determination threshold TH3 in backward steering is greater than the determination threshold TH2, so that it is possible to implement more proper override in consideration of the intention of the driver not contrary to the steering control or a state in which the driver is affected by steering according to the centering steering control and is steering.

The override determination to centering steering is applied from the start of the centering steering control by the alert control to the contact warning control, for example. The determination threshold TH3 in backward steering may correspond to, for example, a determination threshold (an example of a third threshold) for override to the LKAS control. The determination threshold TH2 in forward steering may correspond to, for example, a determination threshold (an example of a fourth threshold) for override to the automatic steering avoidance control or the contact avoidance steering control. For example, in a case where the controller 140 stops the LKAS control when the steering torque amount (steering amount) of the driver during the LKAS control is equal to or greater than the third threshold, the determination threshold TH2 (first threshold) is set to a value closer to the third threshold than the determination threshold TH3 (second threshold). In this way, a value close (a value corresponding) to a determination threshold for override of another driving assistance (existing driving control) is set, so that the driver easily ascertains an operation amount necessary for override.

Second Embodiment: Processing Flow

Figure 22:
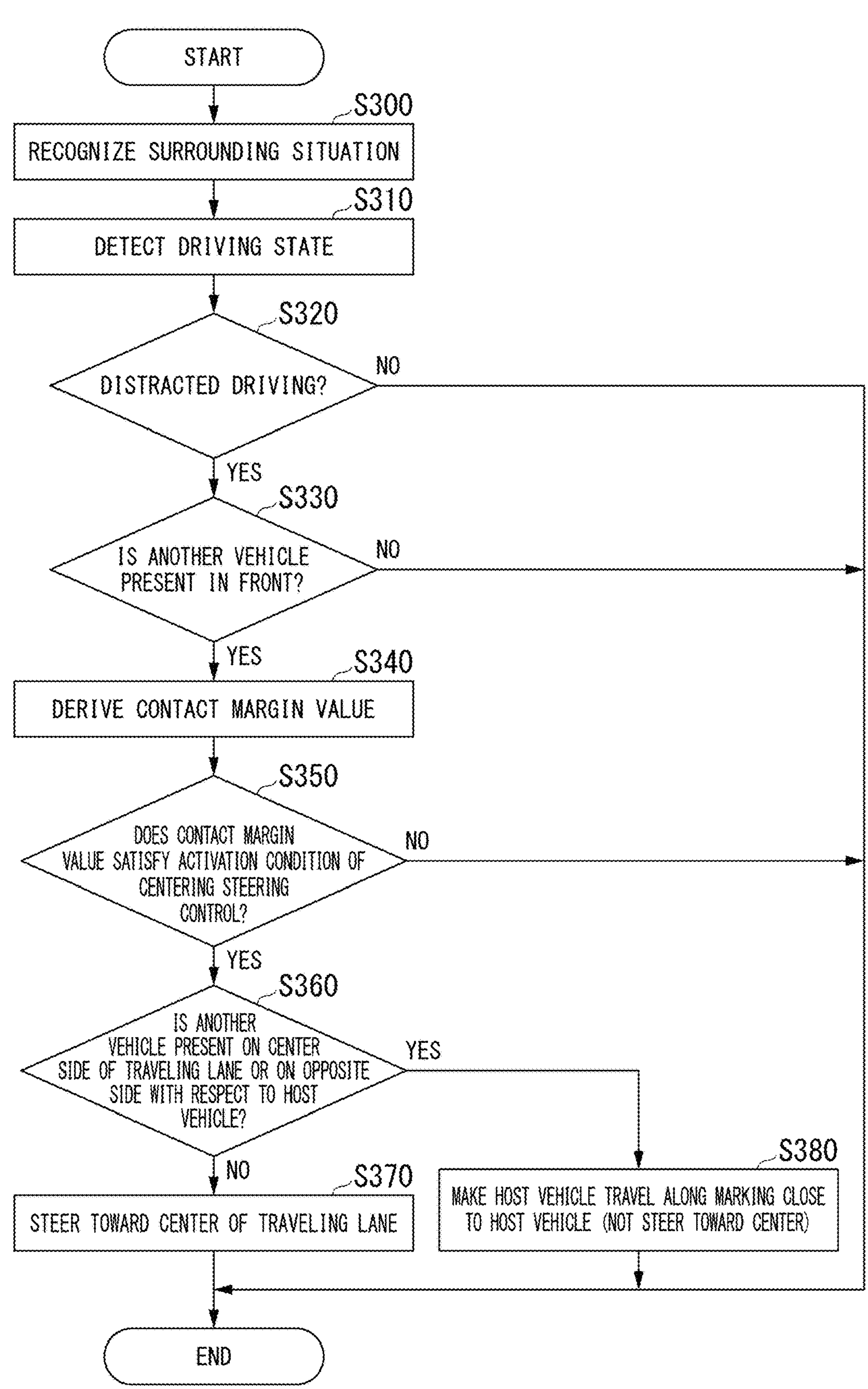
FIG. 22 is a flowchart illustrating an example of processing that is executed by the driving assistance device 100 in the second embodiment.

FIG. 22 is a flowchart illustrating an example of processing that is executed by the driving assistance device 100 in the second embodiment. In the example of FIG. 22, in the processing that is executed by the driving assistance device 100, in particular, processing regarding the centering steering control will be described. In processing of Steps S300 to S340 illustrated in FIG. 22, since processing similar to the processing of Steps S100 to S140 illustrated in FIG. 13 is performed, description will not be repeated.

In the example of FIG. 22, after the contact margin value is calculated, the centering steering controller 144A determines whether or not the contact margin value satisfies an activation condition of the centering steering control (Step S350). When determination is made that the activation condition is satisfied, determination is made whether or not another vehicle m1 is present on the center side of the traveling lane or on the opposite side (in the same lane) of the lane center with respect to the host vehicle M, based on the positional relationship between another vehicle m1 and the host vehicle M recognized by the recognizer 110 (Step S360). When determination is made that another vehicle m1 is not present on the center side of the traveling lane or on the opposite side of the lane center, the centering steering controller 144A executes the centering steering control of steering the host vehicle M toward the center of the traveling lane (Step S370). In the processing of Step S360, when determination is made that another vehicle m1 is present on the center side of the traveling lane or on the opposite side of the lane center with respect to the host vehicle M, the centering steering controller 144A makes the host vehicle M travel along the marking close to the host vehicle M (in other words, does not steer the host vehicle M toward the center) (Step S380). With this, the processing of the present flowchart ends.

When determination is made in the processing of Step S320 to be not distracted driving, when determination is made in the processing of Step S330 that another vehicle is not present in front, and when determination is made in the processing of Step S350 that the contact margin value does not satisfy the activation condition of the centering steering control, the processing of the present flowchart ends.

Figure 23:
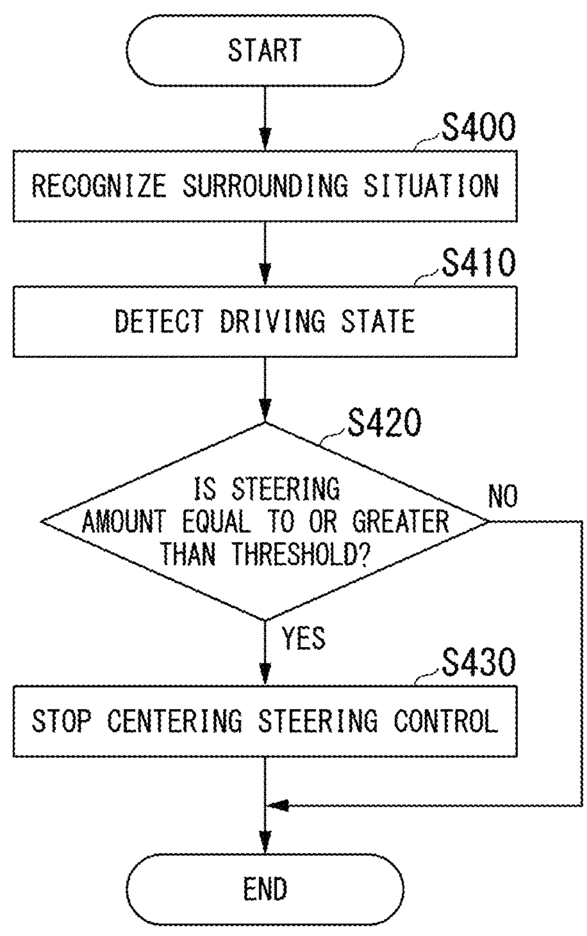
FIG. 23 is a flowchart illustrating an example of override control processing during the centering steering control.

FIG. 23 is a flowchart illustrating an example of override control processing during the centering steering control. In the example of FIG. 23, the recognizer 110 recognizes the surrounding situation of the host vehicle M (Step S400). Next, the driving state detector 120 detects the driving state of the driver (Step S410). Next, the centering steering controller 144A determines whether or not the steering amount (steering torque amount) of the steering wheel 82 by the driver is equal to or greater than the threshold during the centering steering control (Step S420). When determination is made that the steering amount is equal to or greater than the threshold, the centering steering controller 144A stops the centering steering control (Step S430). When determination is made in the processing of Step S420 that the steering amount is not equal to or greater than the threshold, the processing of the present flowchart ends.

As described above, according to the second embodiment, it is possible to perform more proper vehicle control for the occupant according to the surrounding situation of the vehicle. For example, according to the second embodiment, by steering the host vehicle to the lane center when approaching the obstacle in front, when the occupant is not aware of the obstacle in front, it is possible to make the occupant aware of the obstacle in front, and to contribute to avoiding contact with the obstacle in front. When the host vehicle M is within the lane center error range, the host vehicle M is steered toward the lane center, and even when another vehicle is near the lane center, steering assistance to the lane center is performed. Accordingly, when the occupant is not aware of the obstacle, it is possible to increase a possibility that the occupant is aware of the obstacle from the vehicle behavior. When an obstacle is present on the road marking with respect to the host vehicle M, it is possible to assist avoidance of the obstacle by steering the host vehicle toward the lane center. When the horizontal positions of the host vehicle and the obstacle are close to each other (the relative relationship cannot be determined), it is possible to assist avoidance of the obstacle by steering the host vehicle toward the lane center. According to the second embodiment, when an obstacle is present on the lane center side with respect to the host vehicle M or the opposite marking side from the lane center, it is possible to perform more proper steering assistance according to the situation by steering the host vehicle M along the marking on the side close to the host vehicle M (without performing centering steering). Even when there is apparently a distance from the obstacle, deceleration is performed. Accordingly, when the occupant is not aware of the obstacle, it is possible to increase a possibility that the occupant is aware of the obstacle from the vehicle behavior. The centering steering control is executed when determination is made that the driver performs distracted driving. Accordingly, since the alert control is executed only for the driver who does not perform distracted driving, it is possible to suppress unnecessary control.

According to the second embodiment, in the override control to the centering steering control, it is possible to perform more suitable override determination in centering by performing the override determination in consideration of the intention of the occupant from the steering operation direction of the driver. According to the second embodiment, by setting the first threshold set for the forward direction and the second threshold set for the backward direction, and setting the second threshold to a value greater than the first threshold, it is possible to consider the intention of the occupant contrary to the steering control, and to perform more suitable override determination in centering. According to the second embodiment, it is possible to consider the intention of the occupant contrary to the steering control. In addition, an override threshold corresponding to normal driving assistance is set, so that the occupant easily ascertains an operation amount necessary for override.

Modification Examples

In each of the first and second embodiments, at least a part of another embodiment may be combined. For example, the centering steering control may be executed together with the execution of the slow deceleration control for alerting. One of the slow deceleration control and the centering steering control may be selected and executed according to a road situation, a position of a peripheral vehicle, the number of peripheral vehicles, or the like. For example, when determination is made that the driver performs distracted driving, the slow deceleration control and the centering steering control may be performed, and when determination is made that the driver does not perform distracted driving, any one of the slow deceleration and the centering steering control may be performed. When the centering steering control is not executed (for example, when the host vehicle is made to travel along a road marking) or when the host vehicle M moves in a direction of approaching another vehicle m1 by performing the centering steering control, the slow deceleration control may be executed. In this way, it is possible to perform proper vehicle control according to the state of the driver.

In the embodiments described above, the slow deceleration control or the centering steering control may be performed without performing determination about whether or not the driver performs distracted driving. Each numerical value in the above-described embodiments is merely an example, and may be suitably adjusted according to a road situation (shape, the number of lanes, or a road type), a driving situation (distracted degree) of the driver, a vehicle situation (speed, vehicle model, shape, or the number of passengers), or the like.

The above-described embodiment can be expressed as follows.

A vehicle control device comprising:

a storage medium that stores computer-readable instructions, and a processor connected to the storage medium, in which the processor executes the computer-readable instructions to:

recognize a surrounding situation of a host vehicle, control one or both of steering and acceleration/deceleration of the host vehicle when determination is made that an obstacle is present in front of the host vehicle, based on a recognized result, and execute at least steering control of moving the host vehicle to a center of a traveling lane when determination is made that the obstacle is present in front of the host vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a recognizer configured to recognize a surrounding situation of a host vehicle; and a controller configured to control one or both of steering or acceleration/deceleration of the host vehicle when determination is made that an obstacle is present in front of the host vehicle, based on a recognition result of the recognizer, wherein the controller executes at least steering control of moving the host vehicle to a center of a traveling lane when the recognizer determines that the obstacle is present in front of the host vehicle, wherein the steering control is control for making an occupant of the host vehicle aware of the obstacle in front to prompt the occupant to be alert, by a vehicle behavior of horizontally moving near the center, and wherein the controller executes the steering control of moving the host vehicle to the center of the traveling lane, even in a case where obstacle is at any position on the traveling lane, when the host vehicle is traveling within a prescribed range of the center of the traveling lane.

2. The vehicle control device according to claim 1, further comprising:

a driving state detector configured to detect a driving state of the occupant of the host vehicle, wherein the controller controls one or both of the steering or the acceleration/deceleration of the host vehicle when distracted driving of the occupant is detected by the driving state detector.

3. The vehicle control device according to claim 1, wherein the controller executes deceleration control of the host vehicle when not executing the steering control of moving the host vehicle to the center of the traveling lane.

4. A vehicle control method comprising:

by a computer, recognizing a surrounding situation of a host vehicle;

controlling one or both of steering and acceleration/deceleration of the host vehicle when determination is made that an obstacle is present in front of the host vehicle, based on a recognized result;

executing at least steering control of moving the host vehicle to a center of a traveling lane when determination is made that the obstacle is present in front of the host vehicle;

the steering control is control for making an occupant of the host vehicle aware of the obstacle in front to prompt the occupant to be alert, by a vehicle behavior of horizontally moving near the center; and executing the steering control of moving the host vehicle to the center of the traveling lane, even in a case where obstacle is at any position on the traveling lane, when the host vehicle is traveling within a prescribed range of the center of the traveling lane.

5. A computer-readable non-transitory storage medium storing a program for causing a computer to:

recognize a surrounding situation of a host vehicle;

control one or both of steering or acceleration/deceleration of the host vehicle when determination is made that an obstacle is present in front of the host vehicle, based on a recognized result;

execute at least steering control of moving the host vehicle to a center of a traveling lane when determination is made that an obstacle is present in front of the host vehicle;

the steering control is control for making an occupant of the host vehicle aware of the obstacle in front to prompt the occupant to be alert, by a vehicle behavior of horizontally moving near the center; and execute the steering control of moving the host vehicle to the center of the traveling lane, even in a case where obstacle is at any position on the traveling lane, when the host vehicle is traveling within a prescribed range of the center of the traveling lane.

* * * * *